(12) United States Patent
Endo et al.

(10) Patent No.: US 8,723,124 B2
(45) Date of Patent: May 13, 2014

(54) SPECTRUM MEASURING APPARATUS FOR MOVER

(75) Inventors: Masato Endo, Susono (JP); Shinya Kawamata, Gotemba (JP); Ryuji Funayama, Yokohama (JP); Yasukata Yokochi, Susono (JP); Yasuhiro Yoshida, Susono (JP); Kenichi Kitahama, Nagoya (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 0 days.

(21) Appl. No.: 13/322,503
(22) PCT Filed: May 29, 2009
(86) PCT No.: PCT/JP2009/059913
§ 371 (c)(1),
(2), (4) Date: Jan. 24, 2012
(87) PCT Pub. No.: WO2010/137173
PCT Pub. Date: Dec. 2, 2010

(65) Prior Publication Data
US 2012/0113425 A1  May 10, 2012

(51) Int. Cl.
G01J 5/02 (2006.01)
(52) U.S. Cl.
CPC .................................. G01J 5/02 (2013.01)
USPC .................................... 250/339.07
(58) Field of Classification Search
CPC ............................................... G01J 5/02
USPC ............................... 250/339.07, 339.05, 461.1
See application file for complete search history.

(56) References Cited

U.S. PATENT DOCUMENTS

| 6,122,051 A | 9/2000 | Ansley et al. |
| 6,856,354 B1 | 2/2005 | Ohsawa |

(Continued)

FOREIGN PATENT DOCUMENTS

| DE | 296 154 A5 | 11/1991 |
| DE | 10 2004 019 651 A1 | 11/2005 |

(Continued)

OTHER PUBLICATIONS

Kolodner, M. A., "Automated target detection system for hyperspectral imaging sensors," Applied Optics, vol. 47, No. 28, pp. F61-F70, (Oct. 1, 2008).

(Continued)

*Primary Examiner* — David Porta
*Assistant Examiner* — Faye Boosalis
(74) *Attorney, Agent, or Firm* — Oblon, Spivak, McClelland, Maier & Neustadt, L.L.P.

(57) ABSTRACT

Provided is a movable body spectrum measuring apparatus, which can discriminate a measuring object with high precision by photographic data from a spectrum sensor mounted on a movable body such as a vehicle and can process the photographic data in real time. A movable body spectrum measuring apparatus discriminates the measuring object around a vehicle on the basis of the spectrum data from an observation light. A spectrum sensor can measure wavelength information and light intensity information. The movable body spectrum measuring apparatus comprises a dictionary data storing unit storing, as dictionary data, the spectrum data containing the wavelength information and the light intensity information regarding a plurality of predetermined measuring objects, and an arithmetic device for discriminating the measuring object on the basis of comparison computation to compare the spectrum data of the observation light and the spectrum data stored in the dictionary data storing unit. The arithmetic device performs the computation to compare the spectrum data of the observation light with reference to only a partial wavelength band of the spectrum data stored as the dictionary data.

19 Claims, 14 Drawing Sheets

(56) References Cited

U.S. PATENT DOCUMENTS

| | | |
|---|---|---|
| 7,031,496 B2 | 4/2006 | Shimano et al. |
| 7,415,338 B2 | 8/2008 | Monji et al. |
| 2004/0155202 A1* | 8/2004 | Poteet et al. ............... 250/461.1 |
| 2010/0182294 A1 | 7/2010 | Roshan et al. |

FOREIGN PATENT DOCUMENTS

| | | |
|---|---|---|
| DE | 10 2005 024 716 A1 | 12/2006 |
| DE | 10 2008 016 766 A1 | 11/2009 |
| EP | 0642005 | 3/1995 |
| JP | 01 273113 | 11/1989 |
| JP | 08 193945 | 7/1996 |
| JP | 10 221036 | 8/1998 |
| JP | 10 341458 | 12/1998 |
| JP | 2000 113159 | 4/2000 |
| JP | 2000 152269 | 5/2000 |
| JP | 2000 251052 | 9/2000 |
| JP | 2001 165775 | 6/2001 |
| JP | 2001 296180 | 10/2001 |
| JP | 2002 083297 | 3/2002 |
| JP | 2004 280591 | 10/2004 |
| JP | 2005 170063 | 6/2005 |
| JP | 2005 242914 | 9/2005 |
| JP | 2005 283336 | 10/2005 |
| JP | 2005 286649 | 10/2005 |
| JP | 2006 011671 | 1/2006 |
| JP | 2006 507483 | 3/2006 |
| JP | 2006 145362 | 6/2006 |
| JP | 2006 222899 | 8/2006 |
| JP | 2007 293558 | 11/2007 |
| JP | 2008 124941 | 5/2008 |
| JP | 2009 014373 | 1/2009 |
| JP | 2009 105576 | 5/2009 |
| WO | 99 63311 | 12/1999 |
| WO | 2007 126004 | 11/2007 |
| WO | WO 2008/152922 A1 | 12/2008 |

OTHER PUBLICATIONS

International Search Report Issued Jun. 30, 2009 in PCT/JP09/059913 Filed May 29, 2009.
U.S. Appl. No. 13/321,968, filed Nov. 22, 2011, Funayama, et al.
U.S. Appl. No. 13/322,508, filed Nov. 25, 2011, Funayama, et al.
U.S. Appl. No. 13/322,019, filed Nov. 22, 2011, Funayama, et al.
U.S. Appl. No. 13/322,056, filed Nov. 22, 2011, Kawamata, et al.
German Office Action issued Apr. 29, 2013, in German Patent Application No. 11 2009 004 831.5 (with Partial English translation).
Office Action issued Apr. 29, 2013 in German Patent Application No. 112009004829.3 (with English translation).
Notice of Allowance issued on Feb. 14, 2014 in related U.S. Appl. No. 13/321,968.

* cited by examiner

SPECTRUM MEASURING APPARATUS FOR MOVER

FIELD OF THE INVENTION

The present invention relates to a movable body spectrum measuring apparatus for discriminating a measuring object on the basis of spectrum data regarding the measuring object as measured by a spectrum sensor mounted on a movable body such as a vehicle, in particular, an automobile.

BACKGROUND OF THE INVENTION

In recent years, vehicles such as automobiles have been often provided with a drive assisting device that recognizes the state of a pedestrian, a traffic light or the like, which dynamically varies around the vehicle, and assists driving and decision making for the driver. Most of such apparatuses take an image of the state of a traffic light, a pedestrian or the like by use of a CCD camera, processes the taken image in real time to recognize the state and uses the recognition result for the above-mentioned assistance for driving. However, since the shape of a pedestrian generally varies depending on size, orientation or presence or absence of his/her belongings, it is difficult to correctly recognize the existence of a pedestrian on the basis of the shape obtained by the above-mentioned image processing. Although traffic lights are highly standardized in size and color, the shapes disadvantageously vary depending on the viewing angle, and shape recognition through the above-mentioned image processing has its limits.

Patent Document 1 describes a remote sensing technique using spectrum data collected by a spectrum sensor as one technique for recognizing a measuring object. According to this technique, measuring objects such as woods, agricultural fields and urban areas, which are difficult to be recognized only by a visible light region, are discriminated by classifying and characterizing multi-spectrum image data also including invisible light regions photographed by the spectrum sensor mounted on an airplane, an artificial satellite, or the like.

PRIOR ART DOCUMENTS

Patent Documents

Patent Document 1: Japanese Laid-Open Patent Publication No. 2000-251052
Patent Document 2: Japanese Laid-Open Patent Publication No. 2006-145362

DISCLOSURE OF THE INVENTION

Problems to be Solved by the Invention

Since a spectrum sensor observes a brightness value (light intensity) of each wavelength range also including the invisible light region, characteristics of the measuring object can be found by comparing brightness values of wavelengths with each other and furthermore, allowing the measuring object to be discriminated. In addition, in recent years, a hyper spectrum sensor having a wide imageable bandwidth and a high resolution of a few nm to a dozens of nm has been put into practical use as the above-mentioned spectrum sensor (refer to Patent Document 2).

Thus, it has been recently considered that such a spectrum sensor mounted on a vehicle such as an automobile, and various measuring objects around the vehicle are discriminated on the basis of spectrum data taken by the spectrum sensor. However, since the amount of such spectrum data, especially spectrum data obtained by the above-mentioned hyper spectrum sensor is enormous, an increase in time required to process the data is not negligible and real-time adequacy for discriminating the measuring object is necessarily lowered.

Accordingly, it is an objective of the present invention to provide a movable body spectrum measuring apparatus that can discriminate a measuring object with high accuracy on the basis of photographic data taken by a spectrum sensor mounted on a movable body such as a vehicle and can process the photographic data in real time.

Means for Solving the Problems

To achieve the foregoing objective, a movable body spectrum measuring apparatus according to the present invention is provided with a spectrum sensor mounted on a movable body. The spectrum sensor is capable of measuring wavelength information and light intensity information. The movable body spectrum measuring apparatus discriminates a measuring object around the movable body on the basis of spectrum data of observation light detected by the spectrum sensor, and includes a storing unit and an arithmetic device. The storing unit stores therein, as dictionary data, the spectrum data including the wavelength information and the light intensity information about a plurality of predetermined measuring objects. The arithmetic device discriminates the measuring objects on the basis of a comparison computation for comparing the spectrum data of the observation light and the spectrum data stored in the storing unit. The arithmetic device performs the comparison computation for comparing the spectrum data of the observation light and the spectrum data by referring to only a partial wavelength band of the spectrum data stored in the storing unit as the dictionary data.

With such a configuration, the spectrum data for the observation light is compared with the wavelength band of partial spectrum data of dictionary data. Thereby, the time necessary for arithmetic processing for discriminating the measuring object is reduced, and processing for discriminating the measuring object on the basis of the spectrum data of the observation light can be performed in real time. As a result, even when the spectrum measuring apparatus is mounted on a vehicle serving as the movable body, the vehicle can discriminate the measuring object in real time, thereby increasing the adoptability of the spectrum measuring apparatus for drive assistance requiring real-time processing.

Further, reduction in the amount of computation required to discriminate the measuring object results in reduction of the storage capacity of a storing device such as a memory, which can simplify configuration of the spectrum measuring apparatus, thereby improving versatility. Thus, the adoptability of the spectrum measuring apparatus for a movable body is increased.

In accordance with one aspect of the present invention, the spectrum data as the dictionary data is divided into a plurality of wavelength regions, and only data in a wavelength region containing a characteristic change as the spectrum data among the divided wavelength regions is retained in the storing unit as the dictionary data.

With such a configuration, only the wavelength region that is highly characteristic of the spectrum data is stored in the storing unit as the dictionary data. The comparison computation on the basis of the dictionary data is performed with respect to only the wavelength region retained by the dictionary data. Thus, time necessary for arithmetic processing for discriminating the measuring object is reduced.

The spectrum data retained as the dictionary data is limited to only the wavelength region that is highly characteristic of the spectrum data. For this reason, the amount of data is reduced and the storage capacity of the storing unit for retaining the data therein is also reduced.

In accordance with one aspect of the present invention, data in a wavelength region containing the characteristic change as the spectrum data is formed of a plurality of pieces of data determined according to an attribute of the measuring object.

With such a configuration, the wavelength regions contained in the dictionary data consist of only the wavelength regions having characteristic change based on the attribute of the measuring object as the spectrum data. Thus, the comparison computation is performed with respect to only the wavelength regions including significant data having the characteristic change contained in the dictionary data. Thus, the amount of the comparison computation and the capacity of the dictionary data can be reduced, and the discrimination accuracy of the measuring object can be adequately maintained through comparison with the characteristic change.

In accordance with one aspect of the present invention, the spectrum data as the dictionary data is data indicating a bright-line spectrum determined corresponding to an extreme value or an inflection point as spectrum data of each of a plurality of divided wavelength regions. Only the data indicating the bright-line spectrum is retained in the storing unit as the dictionary data.

With such a configuration, the storing unit stores the data indicating each bright-line spectrum in the divided wavelength regions as the dictionary data therein. The comparison computation on the basis of the dictionary data is performed with respect to only the bright-line spectrums retained in the dictionary data. Thus, time necessary for the arithmetic processing for discriminating the measuring object is significantly reduced. Since the spectrum data retained as the dictionary data is limited to the bright-line spectrum, the storage capacity of the storing unit is also significantly reduced.

In accordance with one aspect of the present invention, the data indicating the bright-line spectrum is formed of a plurality of pieces of data determined according to an attribute of the measuring object.

With such a configuration, since the bright-line spectrums contained in the dictionary data are determined according to the attribute of the measuring object, comparison computation is performed on the basis of the bright-line spectrums as significant data according to the attribute of the measuring object, which is contained in the dictionary data. Thus, the amount of comparison computation and the capacity of the dictionary data can be reduced, and the discrimination accuracy of the measuring object can be adequately maintained through comparison with the characteristic change.

In accordance with one aspect of the present invention, in a comparison computation for comparing the spectrum data of the observation light with the spectrum data stored in the storing unit as the dictionary data, the arithmetic device sets an unused region in the spectrum data as the dictionary data and performs the comparison computation on the basis of spectrum data other than the unused region to discriminate the measuring object.

With such a configuration, the unused region is set in the spectrum data as the dictionary data and the spectrum data other than data in the unused region is used in the comparison computation for recognizing the measuring object. Thus, as the wavelength region used in the comparison computation decreases, time necessary for the calculation is reduced.

In accordance with one aspect of the present invention, the unused region is set as a region having a small characteristic change as the spectrum data according to an attribute of the measuring object.

With such a configuration, a region having a small characteristic change as the spectrum data is set as the unused region. Thus, the comparison computation is performed using the region except for the unused region having a small characteristic change, that is, the significant data having the characteristic change. As a result, the amount of the comparison computation can be reduced, and the discrimination accuracy of the measuring object can be adequately maintained through comparison with the data having the characteristic change.

In accordance with one aspect of the present invention, the unused region is made variable according to discrimination request level of the measuring object.

With such a configuration, the discrimination level is made to be low or high by extending or contracting the unused region, and thus, the adequate discrimination level necessary for real-time processing can be selected.

To achieve the foregoing objective, a movable body spectrum measuring apparatus according to the present invention is provided with a spectrum sensor mounted on a movable body. The spectrum sensor is capable of measuring wavelength information and light intensity information. The movable body spectrum measuring apparatus discriminates a measuring object around the movable body on the basis of spectrum data of observation light detected by the spectrum sensor, and includes an attribute map storing unit and an arithmetic device. The attribute map storing unit stores therein, as attribute map data, data indicating a bright-line spectrum determined corresponding to an extreme value or an inflection point as the spectrum data. The arithmetic device performs tentative discrimination of the measuring object on the basis of a comparison computation for comparing the spectrum data of the observation light with the data stored in the storing unit as the attribute map data.

With such a configuration, the spectrum data of the observation light is compared with only data indicating the bright-line spectrum stored in the attribute map storing unit.

Thus, time necessary for tentative discrimination of the measuring object can be reduced. This can reduce the number of times for the comparison computation performed in discrimination, and in turn, the time necessary for discrimination of the measuring object in the spectrum measuring apparatus.

In accordance with one aspect of the present invention, the attribute map data is formed of a plurality of pieces of data determined according to an attribute of the measuring object.

With such a configuration, the bright-line spectrum is determined according to the attribute of the measuring object. Thus, the comparison computation on the basis of the bright-line spectrum as significant data is performed. Thereby, the discrimination accuracy of tentative discrimination can be maintained more adequately.

In accordance with one aspect of the present invention, the movable body spectrum measuring apparatus further includes an attribute map storing unit for storing therein, as attribute map data, data indicating a bright-line spectrum determined corresponding to an extreme value or an inflection point as the spectrum data. Prior to the comparison computation for comparing spectrum data of the observation light with the spectrum data stored in the storing unit as the dictionary data, the arithmetic device performs a comparison computation for comparing the spectrum data of the observation light with the data stored in the storing unit as the attribute map data to perform tentative discrimination of the measuring object, and narrows down in advance a partial wavelength region in the spectrum data as the dictionary data as a wavelength region used in the comparison computation according to an attribute of the measuring object subjected to the tentative discrimination.

With such a configuration, tentative discrimination enables narrowing of the wavelength region of the spectrum data as the dictionary data in each comparison computation, thereby increasing the flexibility in comparison computation.

In accordance with one aspect of the present invention, the movable body is provided with an environment information acquiring device for acquiring surrounding environment information, and the arithmetic device narrows down in advance spectrum data as the dictionary data according to the environment information acquired by the environment information acquiring device.

With such a configuration, the measuring object can be discriminated quickly by preferentially performing the discrimination processing of the measuring object having a high occurrence ratio or the measuring object having a high priority on the basis of the environment information acquired by the environment information acquiring device. The recognition processing of the measuring object having a low occurrence ratio is omitted, thereby reducing time necessary for the discrimination processing.

In accordance with one aspect of the present invention, the environment information acquired by the environment information acquiring device is at least one of weather information and position information of the movable body.

With such a configuration, when the acquired environment information is weather information, the measuring object can be discriminated quickly by increasing the priority of an umbrella, a puddle or the wet measuring object that has a high occurrence ratio in the case of rainy weather and has a low priority in the case of sunny weather. When the environment information is position information of the movable body, the measuring object can be discriminated quickly by setting the measuring object having a high priority for an automobile or a while line on a road in the case of motor highways, a road in the case of agricultural fields, a person or a traffic light in the case of urban areas and a person, especially, a child or older person in the case of residential streets.

In accordance with one aspect of the present invention, the movable body is provided with an intended purpose selecting device for selecting intended purpose of the spectrum sensor, and the arithmetic device narrows down in advance spectrum data as the dictionary data according to the intended purpose selected by the intended purpose selecting device.

With such a configuration, the measuring object set by the intended purpose selecting device can be preferentially discriminated. Thus, the measuring object can be discriminated quickly by preferentially discriminating the measuring object requiring assistance of the spectrum measuring apparatus in the movable body. Furthermore, the recognition processing of the measuring object having a low occurrence ratio is omitted, thereby reducing time necessary for the discrimination processing.

In accordance with one aspect of the present invention, the movable body is provided with a drive assistance system for assisting driving, and the intended purpose selecting device selects the intended purpose in cooperation with the drive assistance system.

With such a configuration, the measuring object can be discriminated quickly by preferentially discriminating the measuring object having a high priority, which is determined according to the intended purpose of the drive assistance system. Further, the recognition processing of the measuring object having a low occurrence ratio is omitted, thereby reducing time necessary for the discrimination processing. In addition, when drive assistance is performed by adaptive cruise control (ACC) to control the distance from the vehicle ahead, a car may be selected as the measuring object having a high priority. When drive assistance is performed by lane keeping assistance control (LKA) to control a lane for the vehicle, a white line on the road surface may be selected as the measuring object having a high priority. When drive assistance is performed by an on-vehicle night vision device (night view), a pedestrian may be selected as the measuring object having a high priority. The measuring object is discriminated in cooperation with a drive assistance system in this manner to attain an object of the assistance. This increases the usability of the movable body spectrum measuring apparatus.

In accordance with one aspect of the present invention, the movable body is provided with a moving state acquiring device for acquiring information on a moving state of the movable body, and spectrum data as the dictionary data is narrowed down in advance according to the moving state acquired by the moving state acquiring device.

With such a configuration, the measuring object can be discriminated quickly by preferentially discriminating the measuring object having a high priority, which is determined according to the moving state acquired by the moving state acquiring device. Furthermore, the recognition processing of the measuring object having a low occurrence ratio is omitted, thereby reducing time necessary for discrimination processing.

In accordance with one aspect of the present invention, information on the moving state of the movable body, which is acquired by the moving state acquiring device, is at least one of speed information, acceleration information and steering information of the movable body.

With such a configuration, a measuring object having a high priority is determined on the basis of speed information, acceleration information or steering information of the movable body. For example, the discrimination processing can be finished within a predetermined period by changing discrimination level on the basis of the speed information or the acceleration information. On the basis of the steering information, the measuring object can be set to the automobile in the case of driving across the motorway and to the pedestrian in the case of driving across the sidewalk.

In accordance with one aspect of the present invention, the movable body is an automobile driving on a road surface.

With such a configuration, even the spectrum measuring apparatus mounted on the automobile can recognize the measuring object that sequentially approaches during driving on the road in real time to achieve adequate drive assistance. This increases the adoptability of the spectrum measuring apparatus for an automobile.

BRIEF DESCRIPTION OF THE DRAWINGS

FIG. 3 are graphs describing wavelength regions of the dictionary data used in discrimination processing in the first embodiment, where

FIG. 5 are graphs describing dictionary data used in discrimination processing for a movable body spectrum measuring apparatus according to a second embodiment of the present invention, where

FIG. 9 are graphs describing dictionary data used in a discrimination processing of a movable body spectrum measuring apparatus according to a fourth embodiment of the present invention, where

FIG. 13 are graphs describing the dictionary data used in a discrimination processing of a movable body spectrum measuring apparatus according to the fifth embodiment of the present invention, where

DETAILED DESCRIPTION OF THE PREFERRED EMBODIMENTS

First Embodiment

A movable body according to a first embodiment provided with a movable body spectrum measuring apparatus of the present invention will be described with reference to FIGS. 1 to 4.

Figure 1:
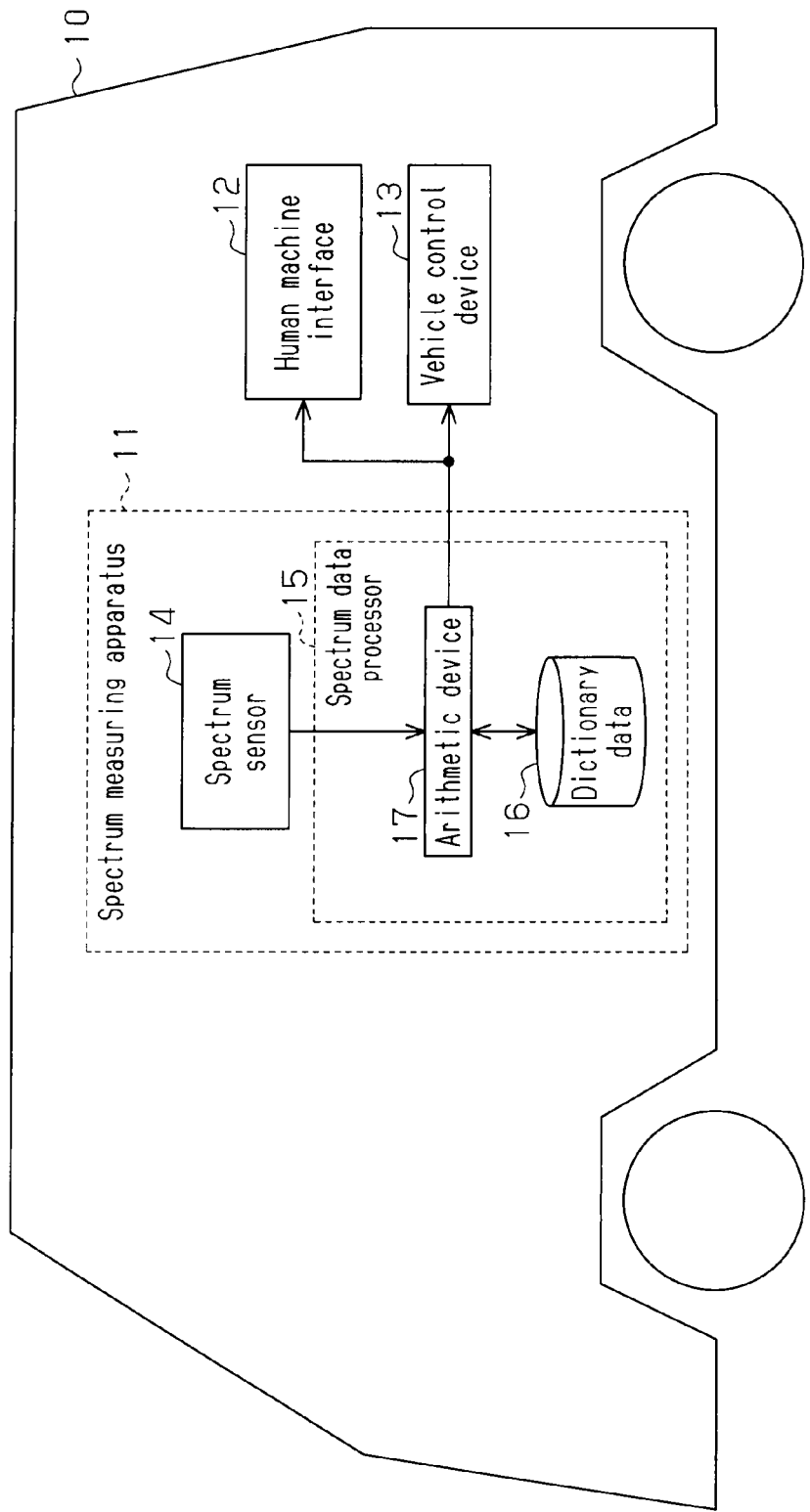
FIG. 1 is a block diagram showing a movable body according to a first embodiment provided with a movable body spectrum measuring apparatus of the present invention.

FIG. 1 is a diagram showing schematic configuration of features of the movable body spectrum measuring apparatus provided on a vehicle as a movable body. As shown in FIG. 1, a vehicle 10 is provided with a spectrum measuring apparatus 11 for acquiring optical information including visible light and nonvisible light outside of the vehicle, a human machine interface 12 for transmitting the information input from the spectrum measuring apparatus 11 to an occupant of the movable body, and a vehicle control device 13 for reflecting the information input from the spectrum measuring apparatus 11 in vehicle control.

The human machine interface 12 is a publicly-known interface device that transmits the state of the vehicle to the occupant, in particular, a driver through light, color, sound or the like, and is provided with an operating device such as a push button or a touch panel so as to input the occupant's decision via a button or the like.

The vehicle control device 13 is one of the control devices mounted in the vehicle and is a device like an engine control device, which is connected to other various control devices directly or via an on-vehicle network and can communicate necessary information with the other control devices. In this embodiment, the vehicle control device 13 transmits input information for an object discriminated by the spectrum measuring apparatus 11 to the other various control devices and allows the vehicle 10 to perform drive assistance as required according to the discriminated object.

The spectrum measuring apparatus 11 is provided with a spectrum sensor 14 for detecting spectrum data of observation light and a spectrum data processor 15 for receiving the spectrum data of the observation light, which is detected by the spectrum sensor 14, and processing the data. The spectrum sensor 14 separates the observation light consisting of visible light and invisible light into predetermined wavelength bands. Then, the observation light is output as spectrum data configured of wavelength information indicating each wavelength forming the wavelength band by the light separation and light intensity information indicating the light intensity of the separated observation light at each wavelength. The spectrum sensor 14 may measure the wavelength information and the light intensity information at the same time or may measure the information as necessary.

The spectrum data processor 15 mainly includes a microcomputer having, for example, an arithmetic device and a storing device. The spectrum data for the observation light, which is detected by the spectrum sensor 14, is input to the spectrum data processor 15. By discriminating the observed measuring object on the basis of the input spectrum data of the observation light and outputting a result, the spectrum data processor 15 outputs the result to the human machine interface 12 and the vehicle control device 13. The spectrum data processor 15 is provided with a dictionary data storing unit 16 for storing spectrum data of each of the measuring objects as dictionary data therein and an arithmetic device 17 for discriminating the measuring object by a computation for comparing the spectrum data of the measuring object as the dictionary data with the spectrum data of the observation light.

The dictionary data storing unit 16 is formed of all or part of a storage area provided in a publicly-known storing device and stores the spectrum data as the dictionary data in the storage area. The dictionary data consists of pieces of the spectrum data of the measuring objects as the objects to be discriminated and is previously prepared for the number of measuring objects to be discriminated. Examples of the measuring objects include a pedestrian (person), a bicycle, a motor-bicycle, and an automobile as movable bodies, and a traffic light, a sign, paint on a road surface, a guard rail, a shop and a signboard as non-movable bodies. As the measuring object, for example, the pedestrian (person) may be classified into a child, an older person, male and female according to more detailed attributes, and the automobile may be classified into a truck, a bus, a sedan, an SUV and a light-car according to more detailed attributes. That is, the storage area as the dictionary data storing unit 16 may be configured of storage areas of one or more storing devices so as to satisfy a storage capacity capable of storing the previously prepared plurality of pieces of dictionary data.

The spectrum data as the dictionary data has wavelength information and light intensity information. For example, the dictionary data of one measuring object includes the light intensity information found by dividing the wavelength band that can be measured by the spectrum sensor by wavelength resolution of the spectrum sensor and the corresponding wavelength information, which forms a pair, and the amount of data is large. For example, given that the wavelength band used in the comparison computation is 400 to 2500 (nm) and the wavelength resolution is 5 (nm), the spectrum data of one measuring object contains 420 pairs of the wavelength information and the light intensity information.

Next, the spectrum data as dictionary data will be described.

Figure 2:
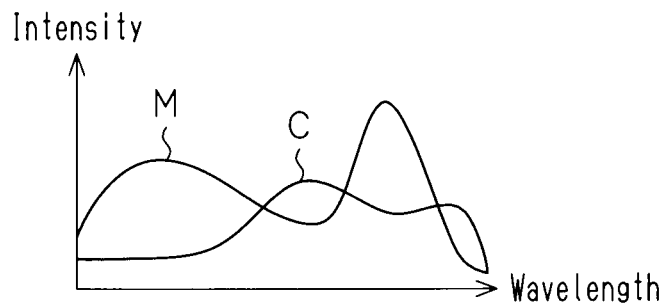
FIG. 2 is a graph showing an example of spectrum data as dictionary data in the first embodiment.

FIG. 2 is a graph showing an example of the spectrum data of the measuring object. As shown in FIG. 2, in the case where the measuring object is a "person", as shown in a graph M, the spectrum data has a protrusion in each of a region of a short wavelength and a region of a long wavelength. In the case where the measuring object is a "car", as shown in a graph C, the spectrum data does not vary in intensity as a whole and has a protrusion in the middle of the wavelength band. The dictionary data is provided on the basis of such spectrum data.

Figure 3A:
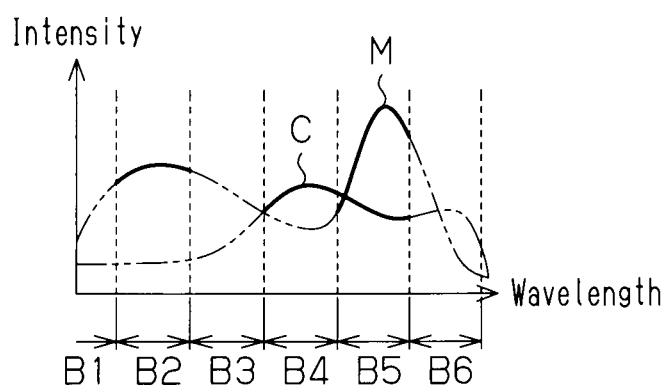
FIG. 3(a) shows the case of two wavelength regions and FIG. 3(b) shows the case of one wavelength region.
Figure 3B:
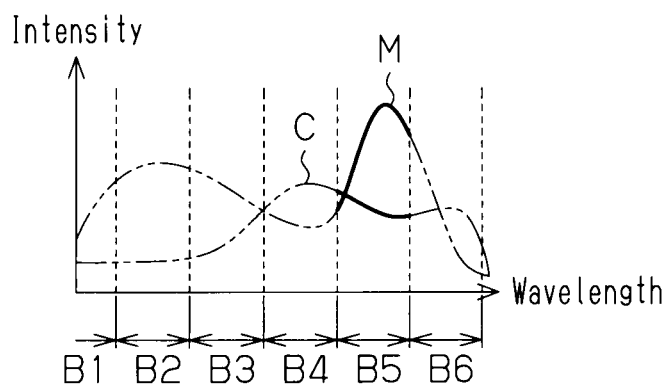

FIG. 3 are graphs showing examples in which the wavelength region of the spectrum data as the dictionary data is limited. FIG. 3(*a*) shows the case of two wavelength regions and FIG. 3(*b*) shows the case of one wavelength region. Describing in detail, the wavelength band, in which the spectrum data of the measuring object is distributed, is divided into a plurality of wavelength regions B1 to B6. The highly characteristic wavelength region among the wavelength regions B1 to B6 is selected from the spectrum data of the measuring object and retained as the dictionary data. For example, in the case of the two wavelength regions, as shown in FIG. 3(*a*), when the measuring object is a "person", the spectrum data of the wavelength region B2 and the wavelength region B5 is retained as being highly characteristic on the basis of the spectrum data of the attribute "person". When the measuring object is a "car", the spectrum data of the wavelength region B4 and the wavelength region B5 is retained as being highly characteristic on the basis of the spectrum data of the attribute "car". As a result, since some wavelength regions among the wavelength regions constituting the spectrum data of the whole wavelength band become missing, for example, as compared with the case where the spectrum data of the whole wavelength band is retained as the dictionary data, the amount of data decreases. Whether or not the spectrum data is highly characteristic may be determined by performing statistical processing of change in the wavelength in the wavelength region, that is, for example, based on whether or not a change rate is a predetermined value or higher, or a maximum value, a minimum value, an extreme value or a an inflection point exists in the wavelength region.

The amount of data can further be decreased by retaining one wavelength region. For example, as shown in FIG. 3(*b*), when the measuring object is a "person", only the spectrum data of the wavelength region B5 is retained as being highly characteristic on the basis of the spectrum data of the attribute "person" as described above. When the measuring object is a "car", only the spectrum data of the wavelength region B5 is retained as being highly characteristic on the basis of the spectrum data of the attribute "car" as described above. Thereby, as compared to the case where the spectrum data of the whole wavelength band is retained as the dictionary data, the amount of data is further decreased. Although the amount of the spectrum data as the dictionary data is reduced as described above, since the spectrum data retained as the dictionary data on the basis of the attribute of the wavelength region is a region where the spectrum data of the measuring object is highly characteristic, even such discrimination processing using the dictionary data can maintain required discrimination accuracy.

Accordingly, in the discrimination processing, for example, in the case where high accuracy is required, or low load is required using high-accuracy dictionary data having a lot of wavelength regions, the discrimination processing that serves the purpose can be achieved by using low-load dictionary data having a small number of wavelength regions.

Alternatively, for example, in the case where high-load discrimination processing can be performed or only low-load discrimination processing can be performed using high-accuracy dictionary data, the discrimination processing corresponding to the load state can be achieved by using low-load dictionary data, depending on the load state of the arithmetic device 17. In this case, the load and the time necessary for the discrimination processing can be changed by selection of the dictionary data.

Figure 4:
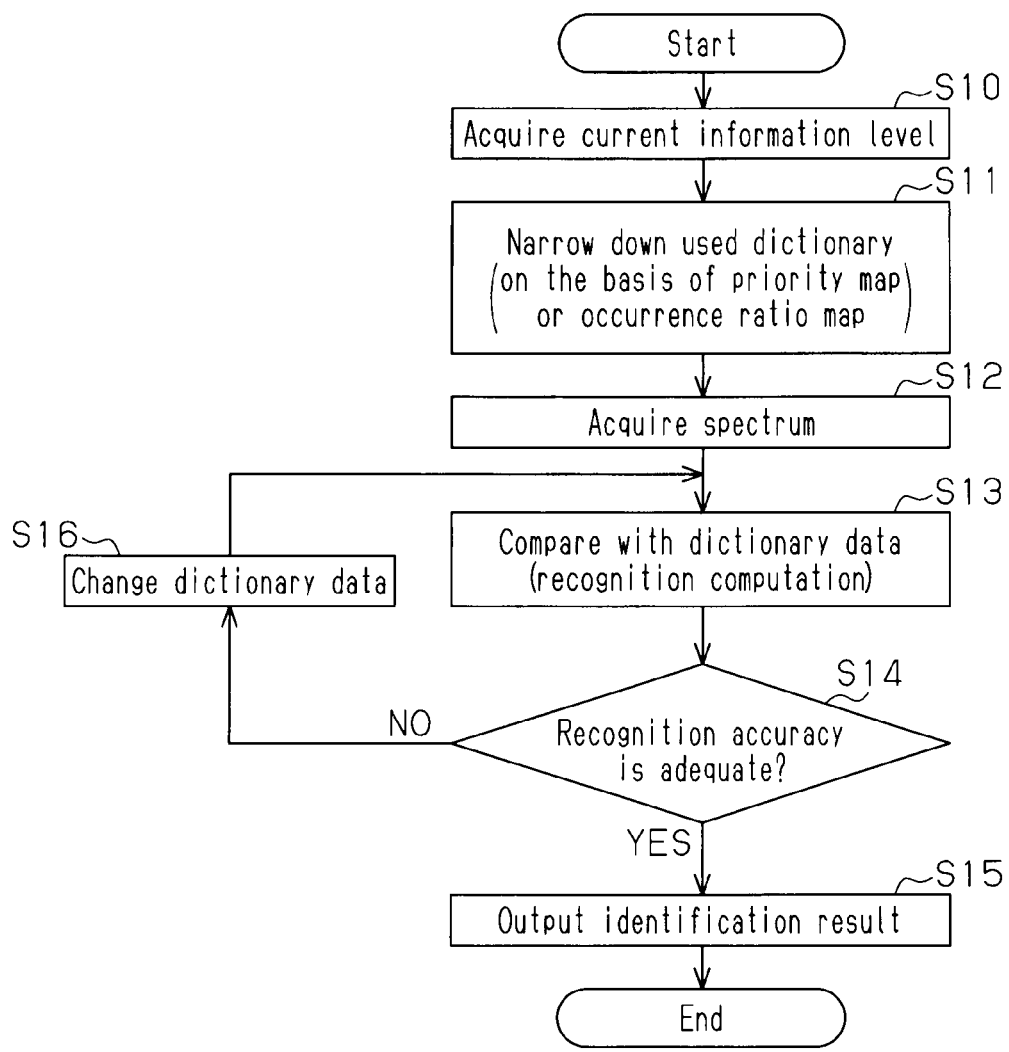
FIG. 4 is a flowchart showing discrimination processing in the first embodiment.

Next, discrimination of a measuring object in the spectrum measuring apparatus in this embodiment will be described with reference to FIG. 4. FIG. 4 is a flowchart showing the discrimination processing of the measuring object by the spectrum measuring apparatus. The discrimination processing is repeatedly performed during activation of the spectrum measuring apparatus 11.

When the discrimination processing is started, the spectrum data processor 15 acquires a current information level (Step S10 in FIG. 4). The current information level is various types of information for narrowing down possibilities for the measuring object, including object information detected by a detecting device separately provided, environment information such as weather and time of day, information on driving area, drive assisting information such as intended purpose, and information on speed, acceleration and steering angle as the state of the vehicle. The various types of information are acquired through a publicly-known measuring device, detecting device or the like, which corresponds to each of the various types of information.

In order to discriminate the narrowed down measuring object, the spectrum data processor 15 narrows down the dictionary data corresponding to the narrowed down measuring object on the basis of the priority or occurrence ratio determined according to the acquired information level (Step S11 in FIG. 4). The measuring object and the dictionary data are narrowed down on the basis of the priority or occurrence ratio, and for example, on the basis of a priority map that previously sets the priority of the measuring objects according to various states or a occurrence ratio map that previously sets the occurrence ratio of the measuring objects according to various states. For example, such narrowing may be set according to various types of priority used in the discrimination processing. When it takes a time to gain access to the narrowed down dictionary data, the narrowed down dictionary data may be previously read into a storing device such as an internal memory that is accessible in a short time.

The spectrum data processor 15 acquires the spectrum data of the observation light, which is input into the arithmetic device 17 as required (Step S12 in FIG. 4), and performs recognition computation for comparing the input spectrum data of the observation light with the dictionary data of the selected measuring object (Step S13 in FIG. 4). At this time, which of the high-accuracy dictionary data or the low-load dictionary data is used in the recognition computation may be determined according to the state of the arithmetic device 17 and the like. That is, when the arithmetic device 17 has a large reserve capacity in computing power, the high-accuracy dictionary data may be selected, and when the arithmetic device 17 has a small reserve capacity in computing power, the low-load dictionary data may be selected. Thus, even the recognition computation based on the small amount of dictionary data can be performed suited to the load state of the arithmetic device 17, and the recognition computation based on the low-load dictionary data can further reduce load and time. The recognition computation may be first started on the basis of the low-load dictionary data irrespective of the load state of the arithmetic device 17. When there are a plurality of measuring objects, the comparison computation with each measuring object may be performed in the order defined by priority or the like until a certain measuring object is recognized or the narrowed down measuring object becomes zero.

When the recognition computation is finished, it is determined whether or not the recognition accuracy is adequate (Step S14 in FIG. 4). For example, when the measuring object is discriminated in most detail, the discrimination accuracy is determined to be adequate. When the measuring object can be further discriminated in more detail, the discrimination accuracy is determined to be inadequate.

When it is determined that the discrimination accuracy is adequate (YES in Step S14 in FIG. 4), the spectrum data processor 15 outputs a discrimination result, that is, an identification result of the measuring object (Step S15 in FIG. 4). Then, the discrimination processing is finished.

In contrast, when it is determined that the discrimination accuracy is inadequate (NO in Step S14 in FIG. 4), the spectrum data processor 15 changes the dictionary data used in the recognition processing of the measuring object to the high-accuracy dictionary data (Step S16 in FIG. 4), and the discrimination processing returns to Step S13 to discriminate the measuring object. That is, in this embodiment, the dictionary data is changed by changing the low-load dictionary data to the high-accuracy dictionary data. Thereby, the discrimination processing of the measuring object is performed with higher accuracy.

As described above, generally, by using a reduced amount of dictionary data in place of the dictionary data constituting a large amount of spectrum data of the measuring objects in the recognition computation, it is possible to reduce the time necessary for the discrimination processing while maintaining adequate discrimination accuracy. Further, by reducing the amount of the dictionary data, the capacity of the dictionary data storing unit 16 that retains the dictionary data therein can also be reduced.

As described above, the movable body spectrum measuring apparatus in this embodiment can achieve advantages listed below.

(1) The spectrum data of the observation light is compared with the wavelength band of partial spectrum data of dictionary data. Thereby, the time necessary for arithmetic processing for discriminating the measuring object is reduced and processing for discriminating the measuring object on the basis of the spectrum data of the observation light can be performed in real time. As a result, even when the spectrum measuring apparatus 11 is mounted on the vehicle 10 as the movable body, the vehicle 10 can discriminate the measuring object in real time, thereby increasing the adoptability of the spectrum measuring apparatus to drive assistance requiring real-time processing.

(2) Reduction of the amount of computation required to discriminate the measuring object results in reduction of the storage capacity of the storing device such as the internal memory. As a result, configuration of the spectrum measuring apparatus 11 is simplified, thereby improving the versatility and increasing the adoptability of the spectrum measuring apparatus 11 to the movable body.

(3) Only the wavelength region that is highly characteristic of the spectrum data is retained in the dictionary data storing unit 16 as the dictionary data. The recognition computation as the comparison computation on the basis of the dictionary data is performed with respect to only the wavelength region retained by the dictionary data. Thereby, the time necessary for arithmetic processing for discriminating the measuring object is reduced.

(4) Only the wavelength region that is highly characteristic of the spectrum data retained as the dictionary data is used for comparison. For this reason, the amount of data is reduced and the storage capacity of the storing unit for retaining the data therein is also reduced.

(5) The wavelength regions contained in the dictionary data consist of only the wavelength regions having characteristic changes based on the attribute of the measuring object as the spectrum data. Thus, the comparison computation is performed with respect to only the wavelength regions including significant data having the characteristic change contained in the dictionary data. Thus, the amount of the comparison computation and the capacity of the dictionary data can be reduced, and the discrimination accuracy of the measuring object can be adequately maintained through comparison with the characteristic change.

Second Embodiment

Next, a second embodiment of the movable body spectrum measuring apparatus according to the present invention will be described with reference to FIGS. 5 and 6. This embodiment has the same configuration as the first embodiment except for an aspect of the spectrum data retained in the dictionary data. Hereinafter, the discrimination processing of the spectrum measuring apparatus 11 will be described centering on the difference between this embodiment and the first embodiment. Overlapping description of configuration of the spectrum measuring apparatus 11 between this embodiment and the first embodiment is omitted.

Figure 5A:
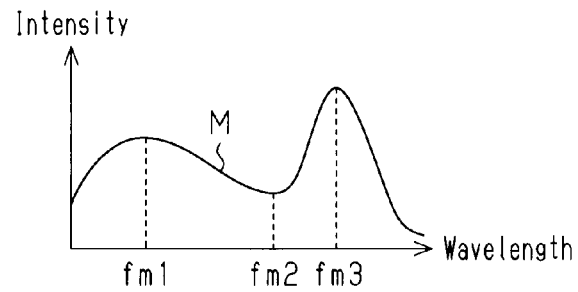
FIG. 5(a) shows the case where a measuring object is a person and FIG. 5(b) shows the case where the measuring object is an automobile.
Figure 5B:
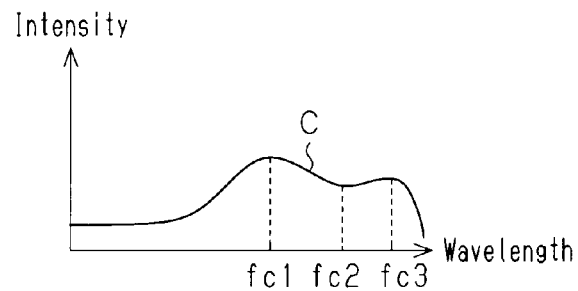

FIG. 5 are graphs showing the spectrum data of the measuring object, FIG. 5(*a*) shows the case where the measuring object is a "person" and FIG. 5(*b*) shows the case where the measuring object is a "car". As shown in a graph M in FIG. 5(*a*), the spectrum data of a "person" has ups and downs and in this graph, three extreme values corresponding to wavelengths fm1, fm2 and fm3, respectively, exist. In other words, in the graph M, bright-line spectrums corresponding to the extreme values are distributed over the wavelengths fm1, fm2 and fm3. As shown in a graph C in FIG. 5(*b*), the spectrum data of a "car" has ups and downs and in this graph, three extreme values corresponding to wavelengths fc1, fc2 and fc3, respectively, exist. In other words, in the graph C, bright-line spectrums corresponding to the extreme values are distributed over the wavelengths fc1, fc2 and fc3. The bright-line spectrums do not necessarily need to be wavelength spectrums corresponding to the extreme values of the spectrum data and may be wavelength spectrums corresponding to inflection points or the like.

In this embodiment, only the bright-line spectrum consists of wavelength information and corresponding wavelength intensity information for each extreme value is retained as the spectrum data of the measuring object retained in the dictionary data storing unit 16. Thus, as compared to the case where the spectrum data of the whole wavelength band is retained as the dictionary data, the amount of data is reduced. At this time, a large number of bright-line spectrums may be set as the high-accuracy dictionary data and a small number of bright-line spectrums may be set as the low-load dictionary data. Even when only the bright-line spectrums are retained as the spectrum data, the bright-line spectrums of the measuring object are characteristically distributed for each measuring object, and even the recognition processing based on such spectrum data can ensure the predetermined discrimination accuracy. In addition, the time necessary for the discrimination processing using the reduced amount of dictionary data is reduced.

Next, discrimination of the measuring object in the spectrum measuring apparatus in this embodiment will be described with reference to FIG. 6. FIG. 6 is a flowchart showing the discrimination processing of the measuring object by the spectrum measuring apparatus. Since the discrimination processing has the same steps as those in the first embodiment, overlapping description is omitted to facilitate illustration.

Figure 6:
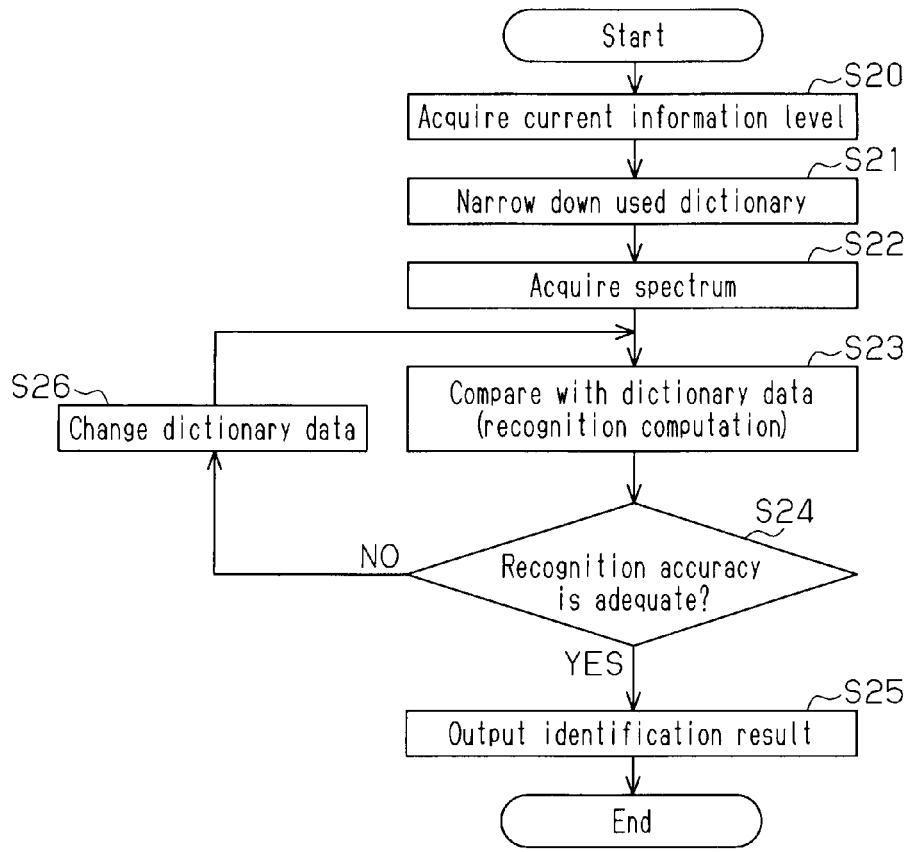
FIG. 6 is a flowchart showing discrimination processing in the second embodiment.

When the discrimination processing is started, the spectrum data processor 15 acquires the current information level (Step S20 in FIG. 6), and on the basis of the priority or occurrence ratio determined according to the acquired information level, narrows dictionary data used in the discrimination processing to discriminate the measuring object having high priority or occurrence ratio (Step S21 in FIG. 6).

The spectrum data processor 15 acquires the spectrum data for the observation light, which is input to the arithmetic device 17 as required (Step S22 in FIG. 6), and performs the recognition computation for comparing the input spectrum data of the observation light with the dictionary data of the selected measuring object (Step S23 in FIG. 6). At this time, the dictionary data used in the recognition computation may also be determined according to the state of the arithmetic device 17. That is, when the arithmetic device 17 has a large reserve capacity in computing power, the high-accuracy dictionary data may be selected, and when the arithmetic device 17 has a small reserve capacity in computing power, the low-load dictionary data may be selected. Thus, even the recognition computation based on the small amount of low-load dictionary data can be performed, and use of the low-load dictionary data according to the load state of the arithmetic device 17 can further reduce load and time. The recognition computation may be first started on the basis of the low-load dictionary data irrespective of the load state of the arithmetic device 17.

When the recognition computation is finished, it is determined whether or not the recognition accuracy is adequate (Step S24 in FIG. 6). For example, when the measuring object is discriminated in most detail, it is determined that the discrimination accuracy is adequate. When the measuring object can further be discriminated in more detail, it is determined that the discrimination accuracy is inadequate.

When it is determined that the discrimination accuracy is adequate (YES in Step S24 in FIG. 6), the spectrum data processor 15 outputs a discrimination result, that is, an identification result of the measuring object (Step S25 in FIG. 6). Then, the discrimination processing is finished.

In contrast, when it is determined that the discrimination accuracy is inadequate (NO in Step S24 in FIG. 6), the spectrum data processor 15 changes the dictionary data used in the recognition processing of the measuring object to the high-accuracy dictionary data (Step S26 in FIG. 6) and returns the discrimination processing to Step S23 to discriminate the measuring object.

As described above, generally, by using the reduced amount of dictionary data in the recognition computation in place of a large amount of spectrum data of the measuring object, time necessary for the discrimination processing can be reduced while maintaining the predetermined discrimination accuracy. Reduction of the amount of dictionary data can also reduce the capacity of the dictionary data storing unit 16 that stores the dictionary data therein.

As described above, this embodiment can achieve advantages that are equal or equivalent to the advantages (1) to (5) in the first embodiment as well as the following advantages.

(6) The data indicating each bright-line spectrum in each of the divided wavelength regions B1 to B6 is retained in the dictionary data storing unit 16 as the dictionary data. The comparison computation on the basis of the dictionary data is performed with respect to only the bright-line spectrums retained in the dictionary data. Thus, time necessary for the arithmetic processing for discriminating the measuring object is significantly reduced. Since the spectrum data retained as the dictionary data is limited to the data of the bright-line spectrums, the storage capacity of the storing unit can be significantly reduced.

(7) The bright-line spectrums contained in the dictionary data are determined according to the attribute of the measuring object. Thus, the comparison computation is performed on the basis of the bright-line spectrums as significant data corresponding to the attribute of the measuring object in the dictionary data. Thereby, the amount of the comparison computation and the capacity of the dictionary data can be reduced and the discrimination accuracy of the measuring object can be adequately maintained through comparison with the attribute of the measuring object.

Third Embodiment

Figure 7:
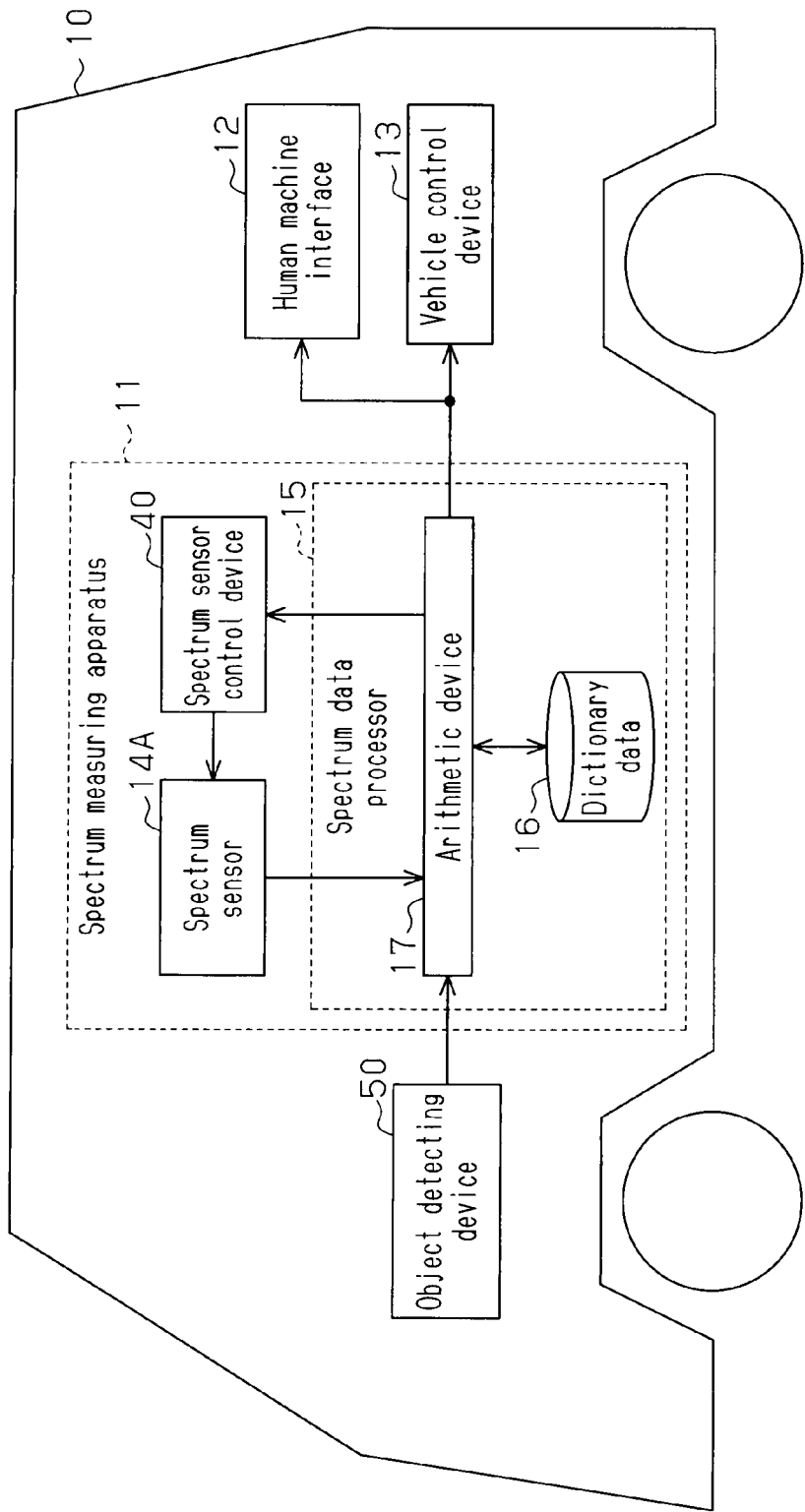
FIG. 7 is a block diagram showing a movable body according to a third embodiment provided with a movable body spectrum measuring apparatus of the present invention.

FIG. 7 shows schematic configuration of a third embodiment of the movable body spectrum measuring apparatus according to the present invention. This embodiment is different from the first embodiment in that the spectrum sensor 14 is changed to a spectrum sensor 14A, a spectrum sensor control device 40 and an object detecting device 50 are added, and the aspect of the spectrum data retained in the dictionary data. Specific configuration of the spectrum measuring apparatus 11 will be described below centering on the differences between this embodiment and the first embodiment. The same members as those in the first embodiment are given the same reference numerals in FIG. 7, and overlapping description thereof is omitted.

FIG. 7 is a diagram showing features of the vehicle as the movable body provided with the movable body spectrum measuring apparatus. As shown in FIG. 7, the vehicle 10 is provided with the object detecting device 50 in addition to the spectrum measuring apparatus 11, the human machine interface 12 and the vehicle control device 13.

The object detecting device 50 is a publicly-known image processing system or any detecting device for detecting a specified object, and transmits information of the detected object to the connected arithmetic device 17. In this embodiment, the object detecting device 50 is a device for detecting a person, a car, a traffic light or the like as the object having a high occurrence ratio in a road environment where the vehicle is moving. That is, the object detecting device 50 informs appearance of the object such as the person, the car, the traffic light or the like to the arithmetic device 17. Examples of the object detecting device 50 include various sensors for detecting persons and animals and various sensors for detecting near by cars.

The spectrum measuring apparatus 11 is provided with the spectrum sensor 14A, the spectrum data processor 15 and the spectrum sensor control device 40. The spectrum data processor 15 is provided with the arithmetic device 17 and the dictionary data storing unit 16.

Like the spectrum sensor 14 in the first embodiment, the spectrum sensor 14A outputs the detected observation light as the spectrum data consisting of the wavelength information and the light intensity information. In this embodiment, the spectrum sensor 14A can change the wavelength for detecting the light intensity information. For example, by setting the wavelength resolution and the wavelength band, only the light intensity information on the wavelength determined by the wavelength resolution and the wavelength band can be detected. Thus, the spectrum sensor 14A outputs the spectrum data of the observation light as the spectrum data of limited wavelength resolution and wavelength band.

The arithmetic device 17 selects the measuring object on the basis of information informed from the connected object detecting device 50. Thereby, the object detected by the object detecting device 50 can be rapidly discriminated in detail.

The spectrum sensor control device 40 is connected to the arithmetic device 17 and the spectrum sensor 14A, receives limitation information on the wavelength resolution and the wavelength band, which is detected from the observation light by the arithmetic device 17, according to the measuring object selected by the arithmetic device 17, and sets the limitation information to the spectrum sensor 14A.

Figure 8A:
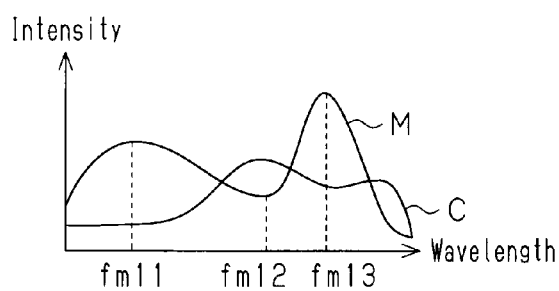
FIG. 8 are graphs showing an example of the spectrum data as dictionary data in the third embodiment, where FIGS. 8(a) and 8(b) each show a difference between two measuring objects.
Figure 8B:
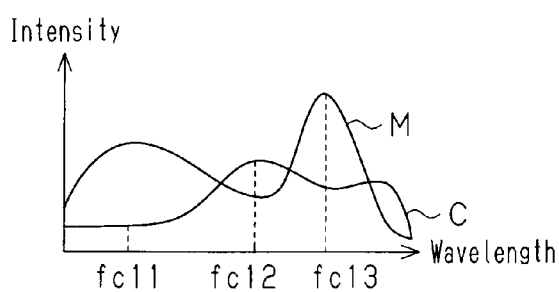

FIGS. 8(*a*) and 8(*b*) are graphs showing the spectrum data of the measuring object, and FIG. 8(*a*) and FIG. 8(*b*) show the spectrum data of a "person" and the spectrum data of a "car", respectively. As shown in FIG. 8(*a*), there are a plurality of sections where a difference between a graph M of the spectrum data of a "person" and a graph C of the spectrum data of a "car" is large in intensity when these graphs are overlapped, and the sections correspond to wavelengths fm11, fm12 and fm13 in the graph M. Similarly, as shown in FIG. 8(*b*), there are a plurality of sections where a difference between a graph M of the spectrum data of a "person" and a graph C of the spectrum data of a "car" is large in intensity when these graphs are overlapped, and the sections correspond to wavelengths fc11, fc12 and fc13 in the graph C. At this time, the wavelength fm11 is the same as the wavelength fc11, the wavelength fm12 is the same as the wavelength fc12 and the wavelength fm13 is the same as the wavelength fc13.

In this embodiment, the spectrum data of the measuring object, which is retained in the dictionary data storing unit 16, includes wavelength intensity information at each of the wavelengths fm11, fm12 and fm13 in the case where the measuring object is a "person", and wavelength intensity information at each of the wavelengths fc11, fc12 and fc13 in the case where the measuring object is a "car". Thus, as compared to the case the spectrum data in the whole wavelength band is retained as the dictionary data, the amount of data is reduced. For example, even when the spectrum data has only the wavelength intensity information (spectrums) on the sections having a large difference between two measuring objects, the two measuring objects are sufficient characteristic to be discriminated with high accuracy and therefore, high discrimination accuracy can be ensured. Time necessary for such discrimination processing using the reduced amount of dictionary data is reduced. The two measuring objects at this time can be rapidly discriminated by selecting the objects having a high occurrence ratio. In the case where the measuring objects of the spectrum measuring apparatus 11 are limited to a "person" and a "car", the discrimination processing is performed reliably.

As described above, generally, by reducing the amount of the dictionary data consisting of a large amount of spectrum data of the measuring object, time necessary for the discrimination processing can be reduced while maintaining the predetermined discrimination accuracy. Reduction of the amount of dictionary data can also reduce the capacity of the dictionary data storing unit 16 that stores the dictionary data therein.

As described above, this embodiment can achieve advantages that are equal or equivalent to the advantages (1) to (5) in the first embodiment as well as the following advantage.

(8) The bright-line spectrums contained in the dictionary data are determined according to the attributes of the two measuring objects. Thus, the comparison computation is performed on the basis of the bright-line spectrums contained in the dictionary data, as significant data according to the attributes of the two measuring objects. Thereby, the amount of the comparison computation and the capacity of the dictionary data can be reduced, and the discrimination accuracy of the two measuring objects can be adequately maintained through comparison between the attributes of the two measuring objects.

Fourth Embodiment

Next, a fourth embodiment of the movable body spectrum measuring apparatus according to the present invention will be described with reference to FIG. 9. This embodiment has the same configuration as the first embodiment and is different from the first embodiment in an aspect of the spectrum data retained in the dictionary data. The aspect of the spectrum data retained in the dictionary data, as the difference between this embodiment and the first embodiment, will be described below. Overlapping description of configuration of the spectrum measuring apparatus 11 between this embodiment and the first embodiment is omitted.

In this embodiment, the data contained in the dictionary data is not limited to the spectrum data itself and only needs to be data that is set based on the attribute of the measuring object and enables discrimination of the measuring object. To facilitate illustration, the data as the dictionary data is referred to as attribute map data.

FIGS. 9(*a*) and 9(*b*) are graphs showing the spectrum data of the measuring object, and FIG. 9(*a*) and FIG. 9(*b*) show a graph M of the spectrum data of a "person" and a graph C of the spectrum data of a "car", respectively. FIG. 9(*a*) shows some wavelength regions B2, B4 and B5 among previously divided wavelength regions and FIG. 9(*b*) shows a wavelength region B5 among the previously divided wavelength regions.

Figure 9A:
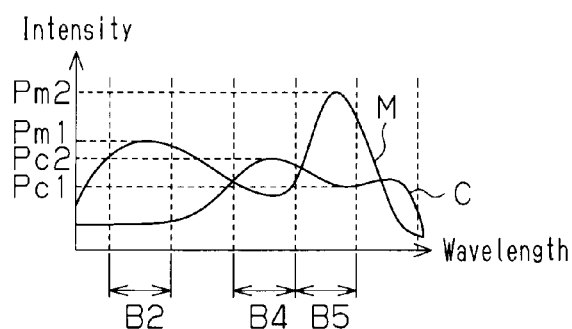
FIG. 9(a) shows the case of a plurality of wavelength regions and FIG. 9(b) shows the case of one wavelength region.
Figure 9B:
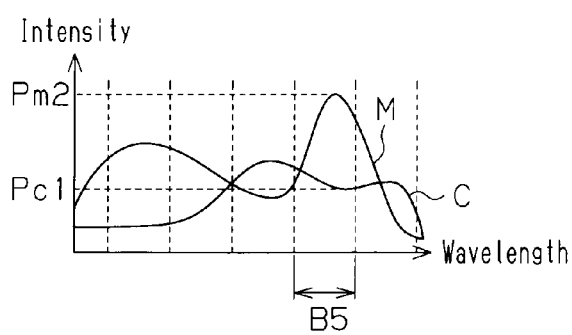

In this embodiment, the attribute map data as the dictionary data of the measuring object, which is retained in the dictionary data storing unit 16, has the wavelength region that is highly characteristic of the spectrum data of the measuring object and intensity information in the wavelength region. The attribute map data has high-accuracy dictionary data having intensity information in the wavelength regions and low-load dictionary data having only intensity information in a smaller number of wavelength regions. For example, in the case where the measuring object is a "person", the high-accuracy dictionary data having two wavelength regions has, as shown in FIG. 9(a), information in the wavelength region B2 and its maximum wavelength intensity Pm1, and information in the wavelength region B5 and its maximum wavelength intensity Pm2. In the case where the measuring object is a "car", the high-accuracy dictionary data has information in the wavelength region B4 and its maximum wavelength intensity Pc2, and information in the wavelength region B5 and its minimum wavelength intensity Pc1. In the case where the measuring object is a "person", the low-load dictionary data having one wavelength region has, as shown in FIG. 9(b), information in the wavelength region B5 and its maximum wavelength intensity Pm2. In the case where the measuring object is a "car", the low-load dictionary data has information in the wavelength region B5 and its minimum wavelength intensity Pc1. Thus, as compared with the case where the spectrum data in the whole wavelength band is retained as the dictionary data, the amount of data is reduced. Time necessary for such discrimination processing using the reduced amount of dictionary data is reduced. In this embodiment, since the wavelength intensities Pm1, Pm2, Pc1 and Pct are extreme values, they match the bright-line spectrums.

Figure 10:
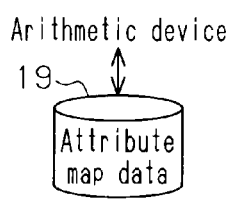
FIG. 10 is a block diagram showing an example of an attribute map storing unit in the fourth embodiment.

The attribute map data may be data that remarkably changes by various statistical data in the whole spectrum data, such as information consisting of a highest point and the width of the protrusion and information on a wavelength band having a high rate of change. Also in this case, as compared with the case where the spectrum data in the whole wavelength band is retained as the dictionary data, the amount of data is reduced. As shown in FIG. 10, the attribute map data may be retained in an attribute map storing unit 19 provided separately from the dictionary data storing unit 16, and the arithmetic device 17 gains access to the attribute map storing unit 19 and acquires the attribute map data.

As described above, generally, by using the reduced amount of dictionary data in the recognition computation in place of the dictionary data consisting of a large amount of spectrum data of the measuring object, the time necessary for the discrimination processing can be reduced while maintaining the predetermined discrimination accuracy. Reduction of the amount of the dictionary data can also reduce the capacity of the dictionary data storing unit 16 that stores the dictionary data therein.

As described above, this embodiment can achieve advantages that are equal or equivalent to the advantages (1) to (5) in the first embodiment as well as the following advantage.

(9) The spectrum data of the observation light is compared with only the data indicating the bright-line spectrums stored in the dictionary data storing unit 16 or the attribute map storing unit 19. Thus, time necessary for the discrimination processing of the measuring object can be reduced. By reducing the number of times of the comparison computation in discrimination in this manner, times necessary for discrimination of the measuring object by the spectrum measuring apparatus can be reduced.

Fifth Embodiment

Figure 11:
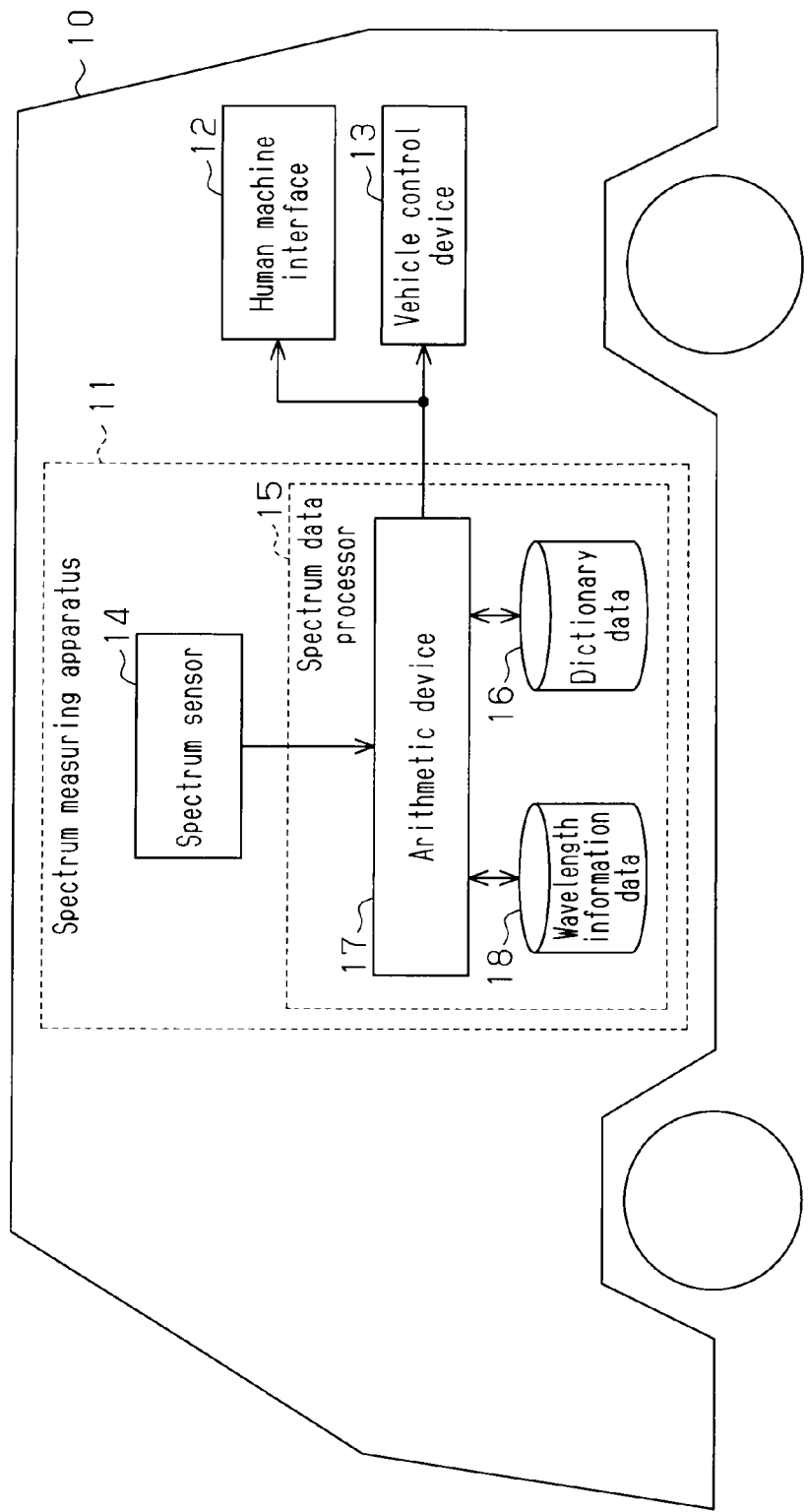
FIG. 11 is a block diagram showing a movable body according to a fifth embodiment provided with a movable body spectrum measuring apparatus of the present invention.

FIG. 11 shows schematic configuration of a fifth embodiment of the movable body spectrum measuring apparatus according to the present invention. This embodiment is different from the first embodiment in that a wavelength information data storing unit 18 is added. Specific configuration of the spectrum measuring apparatus 11 will be described below centering on the difference between this embodiment and the first embodiment. The same members as those in the first embodiment are given the same reference numerals in FIG. 11, and overlapping description thereof is omitted.

FIG. 11 is a block diagram showing features of the vehicle as the movable body provided with the movable body spectrum measuring apparatus. As shown in FIG. 11, the vehicle 10 is provided with the wavelength information data storing unit 18 in addition to the spectrum measuring apparatus 11, the human machine interface 12 and the vehicle control device 13.

Figure 12:
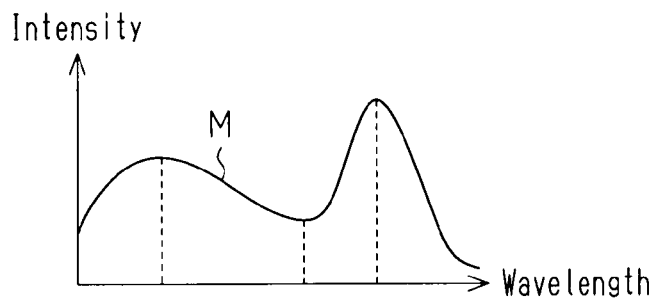
FIG. 12 is a graph showing an example of the spectrum data as dictionary data in the fifth embodiment.

As shown in a graph M in FIG. 12, the spectrum data having a protrusion in each of a region of short wavelength and a region of long wavelength is retained in the dictionary data storing unit 16 as the dictionary data corresponding to the spectrum data of a "person". The spectrum data as the dictionary data has the wavelength information and the light intensity information, and the amount of data is large. For example, given that the wavelength band used in the comparison computation is 400 to 2500 (nm) and the wavelength resolution is 5 (nm), the spectrum data of one measuring object contains 420 pairs of the wavelength information and the light intensity information.

Figure 13A:
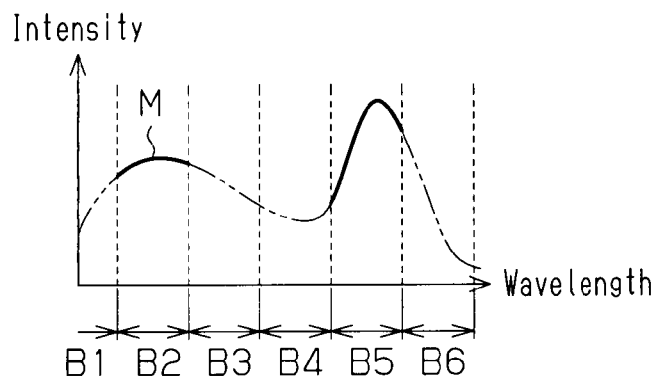
FIG. 13(a) shows the case of two wavelength regions and FIG. 13(b) shows the case of one wavelength region.
Figure 13B:
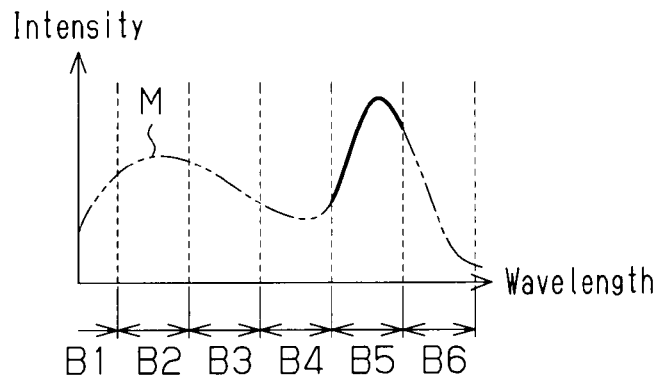

The wavelength information data having information on the highly characteristic wavelength regions among the wavelength regions of the spectrum data, which are previously divided according to the measuring object, is retained in the wavelength information data storing unit 18. The wavelength information data includes high-accuracy wavelength information data and low-load wavelength information data. That is, as shown in FIG. 13(a), in the case where the measuring object is a "person", two wavelength regions B2, B5 in the wavelength band of the spectrum data of a "person" are set as the high-accuracy wavelength information data. As shown in FIG. 13(b), in the case where the measuring object is a "person", one wavelength region B5 in the wavelength band of the spectrum data of a "person" is set as the low-load wavelength information data.

As described above, the high-accuracy or low-load wavelength information data for a "person", which is retained in the wavelength information data storing unit 18, is applied to the spectrum data of the measuring object "person", which is retained in the dictionary data storing unit 16. As a result, a small amount of spectrum data consisting of only the wavelength region set to the wavelength information data can be acquired as the dictionary data. That is, for the dictionary data formed of the spectrum data having a wide wavelength band, an unused wavelength band is set as an unused region, and the spectrum data other than the data in the unused region is used in the comparison computation. Since the unused region includes a small characteristic change, lowering of the discrimination accuracy due to the unused region can be made small.

Figure 14:
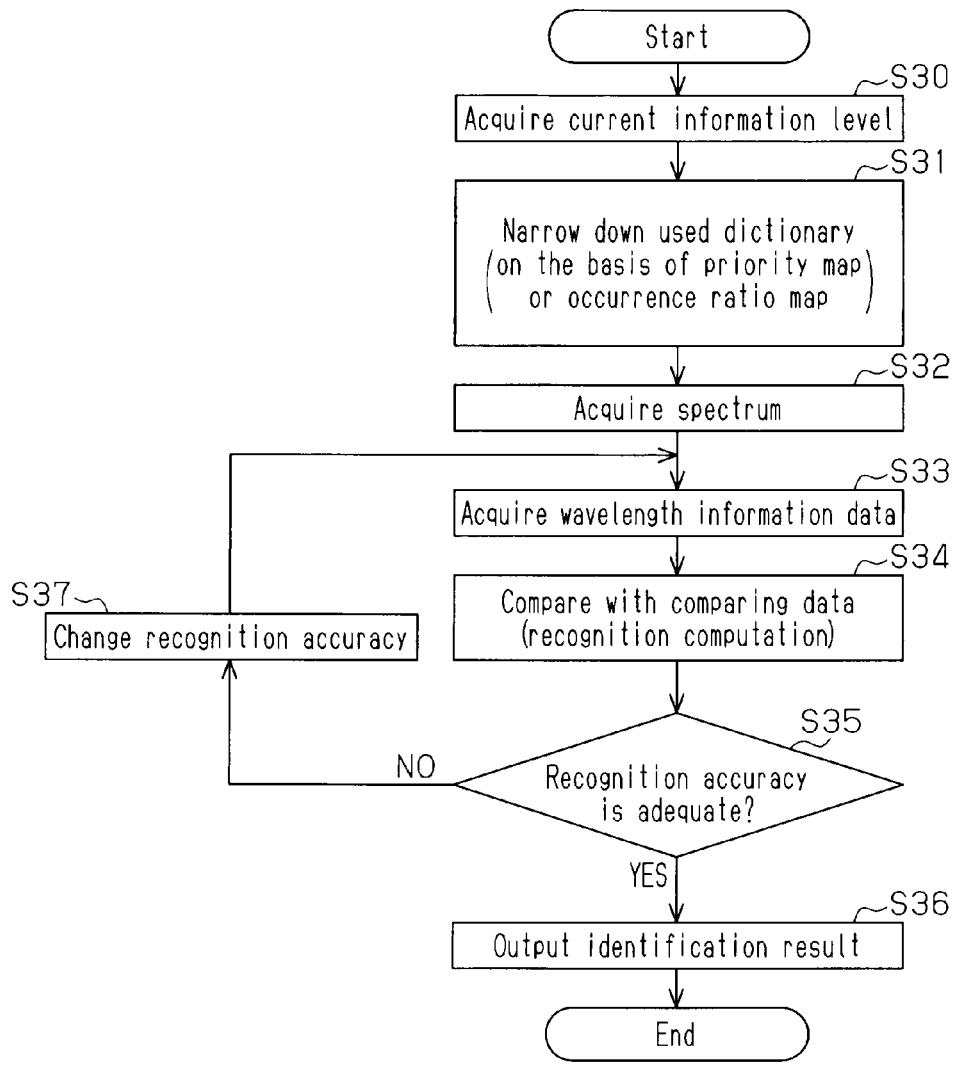
FIG. 14 is a flowchart showing discrimination processing in the fifth embodiment.

Next, discrimination of the measuring object in the spectrum measuring apparatus in this embodiment will be described with reference to FIG. 14. FIG. 14 is a flowchart showing the discrimination processing of the measuring object by the spectrum measuring apparatus. This discrimination processing is repeatedly performed during activation of the spectrum measuring apparatus 11.

When the discrimination processing is started, the spectrum data processor 15 acquires the current information level (Step S30 in FIG. 14). The current information level is various types of information for narrowing down the measuring object, including information on an object detected by a detecting device separately provided, environment information such as weather and time of day, information on driving area, drive assisting information such as an intended purpose, and information on speed, acceleration and steering angle as the state of the vehicle. The various types of information are acquired through a publicly-known measuring device, detecting device or the like, which corresponds to each of the various types of information.

In order to discriminate the narrowed down measuring object having high priority or occurrence ratio, the spectrum data processor 15 narrows down the dictionary data corresponding to the narrowed down measuring object on the basis of the priority or occurrence ratio determined according to the acquired information level (Step S31 in FIG. 14). The measuring object and the dictionary data are narrowed down on the basis of the high priority or occurrence ratio, and for example, on the basis of the priority map that previously sets the priority of the measuring objects according to various states or the occurrence ratio map that previously sets the occurrence ratio of the measuring objects according to various states. For example, such narrowing down may be executed according to various types of priority used in the discrimination processing. When it takes time to gain access to the narrowed down dictionary data, the narrowed down dictionary data may be previously read into the storing device such as the internal memory that is accessible in a short time.

The spectrum data processor 15 acquires the spectrum data of the observation light, which is input to the arithmetic device 17 as required (Step S32 in FIG. 14).

In this embodiment, the spectrum data processor 15 acquires the wavelength information data corresponding to the selected measuring object from the wavelength information data storing unit 18 (Step S33 in FIG. 14). At this time, which of the high-accuracy wavelength information data or the low-load wavelength information data is used as the wavelength information data that limits the wavelength band of the dictionary data in the recognition computation may be determined depending on the state of the arithmetic device 17 and the like. That is, when the arithmetic device 17 has a large reserve capacity in computing power, the high-accuracy wavelength information data may be selected, and when the arithmetic device 17 has a small reserve capacity in computing power, the low-load wavelength information may be selected. Thus, even the recognition computation based on the small amount of data can be performed suited to the load state of the arithmetic device 17, and the recognition computation based on the low-load dictionary data can further reduce load and time. The recognition computation may be first started on the basis of the low-load wavelength information data irrespective of the load state of the arithmetic device 17.

Then, the spectrum data processor 15 performs the recognition computation for comparing the input spectrum data of the observation light with the dictionary data of the selected measuring object. In this recognition computation, only the wavelength region designated as the wavelength information data is used for comparison (Step S34 in FIG. 14). When the recognition computation is finished, it is determined that the recognition accuracy is adequate (Step S35 in FIG. 14). For example, when the measuring object is discriminated in most detail, it is determined that the discrimination accuracy is adequate. In contrast, when the measuring object can be discriminated in more detail, it is determined that the discrimination accuracy is inadequate.

When it is determined that the discrimination accuracy is adequate (YES in Step S35 in FIG. 14), the spectrum data processor 15 outputs a discrimination result, that is, an identification result of the measuring object (Step S36 in FIG. 14). Then, the discrimination processing is finished.

In contrast, when it is determined that the discrimination accuracy is inadequate (NO in Step S35 in FIG. 14), the spectrum data processor 15 changes the recognition accuracy to be high (Step S37 in FIG. 14), returns the discrimination processing to Step S33 and selects the high-load wavelength information data to discriminate the measuring object. That is, in this embodiment, the recognition accuracy is changed by changing the low-load wavelength information data to the high-load wavelength information data. Thereby, the discrimination processing of the measuring object is performed with higher accuracy.

Thus, by reducing the amount of data in the recognition computation, an increase in time necessary for the discrimination processing can be suppressed while maintaining the adequate discrimination accuracy.

As described above, this embodiment can achieve advantages that are equal or equivalent to the advantages (1) and (2) in the first embodiment as well as the following advantages.

(10) The unused region is set in the spectrum data as the dictionary data and the spectrum data other than the data in the unused region is used in the comparison computation for recognizing the measuring object. Thus, as the number of the wavelength regions used in the comparison computation is reduced, the time necessary for calculation is reduced.

(11) The region where the spectrum data has a small characteristic change is set as the unused region. Thus, the comparison computation is performed using the region other than the unused region having a small characteristic change, that is, significant data having characteristic change. As a result, the amount of the comparison computation can be reduced, and the discrimination accuracy of the measuring object can be adequately maintained through comparison with data having characteristic change.

Sixth Embodiment

Next, a sixth embodiment of the movable body spectrum measuring apparatus according to the present invention will be described with reference to FIGS. 15 and 16. This embodiment has the same configuration as the fifth embodiment and is different from the fifth embodiment in an aspect of the spectrum data retained in the dictionary data and a part of the steps of the discrimination processing. The discrimination processing of the spectrum measuring apparatus 11 will be described below centering on the differences between this embodiment and the fifth embodiment. Overlapping description of the configuration of the spectrum measuring apparatus 11 between this embodiment and the fifth embodiment is omitted.

Figure 15:
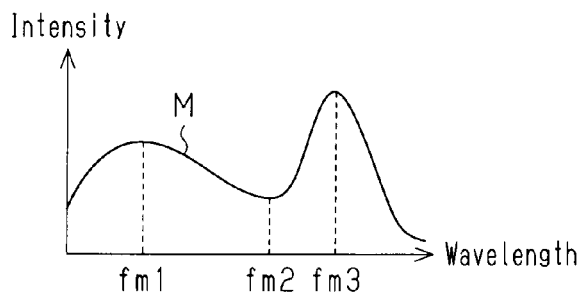
FIG. 15 is a graph describing dictionary data used in a discrimination processing of a movable body spectrum measuring apparatus according to a sixth embodiment of the present invention.

As shown in a graph M in FIG. 15, the spectrum data having a protrusion in each of a region of short wavelength and a region of long wavelength is retained in the dictionary data storing unit 16 as the dictionary data corresponding to the spectrum data of a "person". As described above, the dictionary data has much wavelength information and light intensity information, and the amount of data is large.

The bright-line spectrums as characteristic parts of the spectrum data is retained in the wavelength information data storing unit 18 according to the measuring object as the wavelength information data. Alternatively, the high-accuracy wavelength information data and the low-load wavelength information data may be provided as the wavelength information data. For example, as shown in FIG. 15, the bright-line spectrums corresponding to the wavelengths fm1, fm2 and fm3 of the spectrum data of a "person" are set as the high-accuracy wavelength information data in the case where the measuring object is a "person". The bright-line spectrum of only the wavelength fm3 of the spectrum data of a "person" may be set as the low-load wavelength information data.

As described above, the high-accuracy or low-load wavelength information data for a "person", which is retained in the wavelength information data storing unit 18, is applied to the spectrum data of the measuring object of a "person", which is retained in the dictionary data storing unit 16. This can acquire a small amount of spectrum data, in which the wavelength band is limited to the wavelength information data.

Next, discrimination of the measuring object in the spectrum measuring apparatus in this embodiment will be described with reference to FIG. 16. FIG. 16 is a flowchart showing the discrimination processing of the measuring object by the spectrum measuring apparatus. Since this discrimination processing has the same steps as those in the fifth embodiment, overlapping description is omitted to facilitate illustration.

Figure 16:
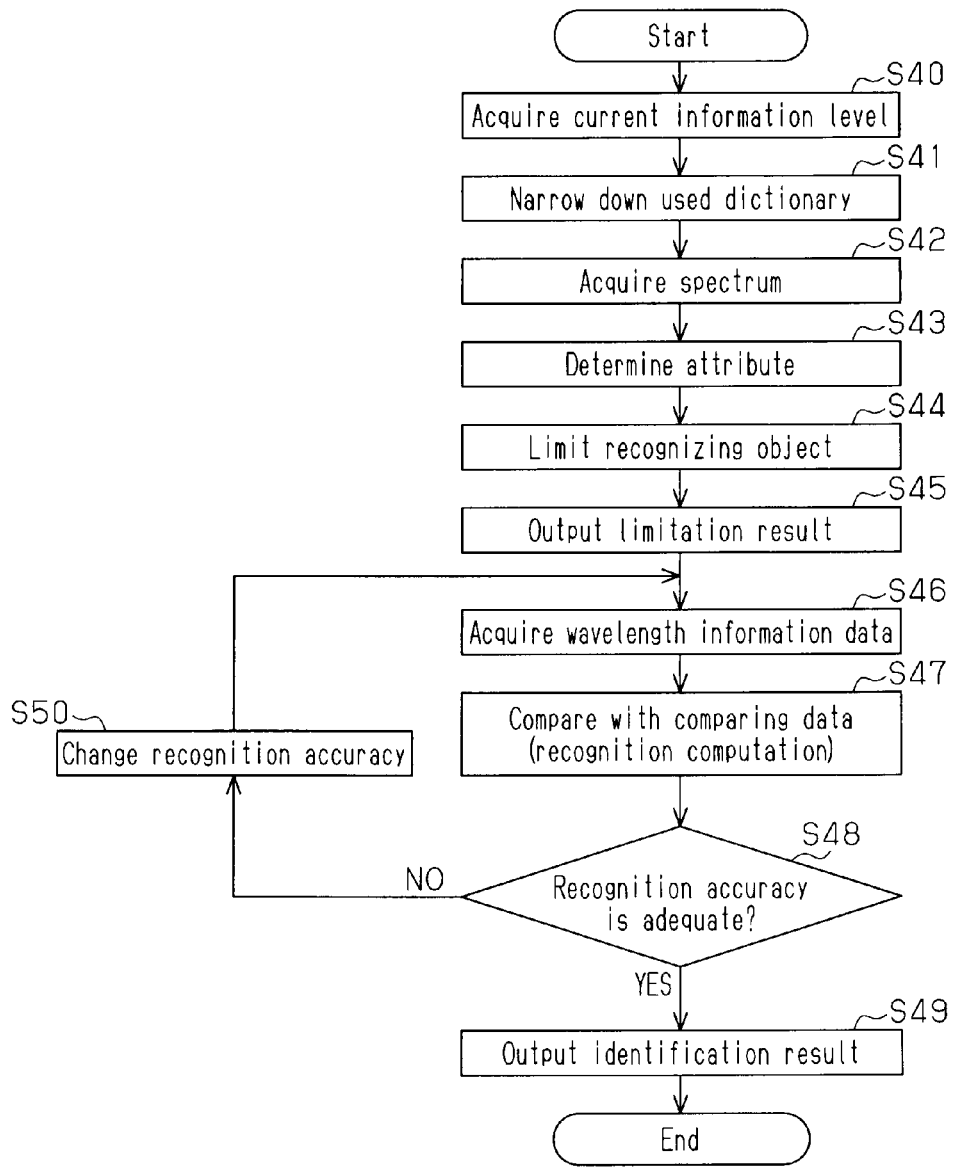
FIG. 16 is a flowchart showing discrimination processing in the sixth embodiment.

When the discrimination processing is started, the spectrum data processor 15 acquires the current information level (Step S40 in FIG. 16) and narrows down the dictionary data determined according to the acquired information level and is used in the discrimination processing to discriminate the measuring object (Step S41 in FIG. 16).

The spectrum data processor 15 acquires the spectrum data of the observation light, which is input to the arithmetic device 17 as required (Step S42 in FIG. 16).

This embodiment exemplifies the case where tentative discrimination is performed prior to the recognition computation. That is, for example, the attribute of the measuring object is recognized from the spectrum data of the observation light on the basis of especially the low-load dictionary data among the dictionary data, such as the above-mentioned one bright-line spectrum and the attribute map data, and information other than the spectrum data (Step S43 in FIG. 16). According to the recognized attribute of the measuring object, the measuring object as the recognizing object is limited to a predetermined range (Step S44 in FIG. 16), and a limitation result is output (Step S45 in FIG. 16). As described above, by the tentative discrimination performed prior to the recognition computation, the measuring object is narrowed down and discrimination is rapidly achieved.

When the result of the tentative discrimination is output, the spectrum data processor 15 narrows down the selected measuring object according to the result of the tentative discrimination and acquires the wavelength information data corresponding to the selected measuring object from the wavelength information data storing unit 18 (Step S46 in FIG. 16).

Then, the spectrum data processor 15 performs the recognition computation for comparing the input spectrum data of the observation light with the dictionary data of the selected measuring object. In this recognition computation, only the bright-line spectrum designated as the wavelength information data is used for comparison (Step S47 in FIG. 16). When the recognition computation is finished, it is determined whether or not the recognition accuracy is adequate (Step S48 in FIG. 16). When it is determined that the discrimination accuracy is adequate (YES in Step S48 in FIG. 16), the spectrum data processor 15 outputs a discrimination result, that is, an identification result of the measuring object (Step S49 in FIG. 16). Then, the discrimination processing is finished.

In contrast, when it is determined that the discrimination accuracy is inadequate (NO in Step S48 in FIG. 16), the spectrum data processor 15 changes the recognition accuracy to be high (Step S50 in FIG. 16), returns the discrimination processing to Step S46 and selects the high-accuracy wavelength information data to discriminate the measuring object. That is, in this embodiment, the recognition accuracy is changed by changing the low-load wavelength information data to the high-accuracy wavelength information data. Thereby, the discrimination processing of the measuring object is performed with higher accuracy.

In this manner, the amount of data in the recognition computation can be reduced while maintaining the adequate discrimination accuracy and preventing the time necessary for the discrimination processing from being increased.

As described above, this embodiment can achieve advantages that are equal or equivalent to the advantages (1) and (2) in the first embodiment and the advantages (10) and (11) in the fifth embodiment as well as the following advantage.

(12) The wavelength information data, in which the bright-line spectrum of each of the divided wavelength regions is set, is retained in the wavelength information data storing unit 18. The comparison computation on the basis of the wavelength information data and the dictionary data is performed with respect to only the bright-line spectrums retained in the dictionary data. As a result, the time necessary for the arithmetic processing for discriminating the measuring object can be significantly reduced.

Seventh Embodiment

Next, a seventh embodiment of the movable body spectrum measuring apparatus according to the present invention will be described with reference to FIG. 17. This embodiment has the same configuration as the fifth embodiment and is different from the fifth embodiment in an aspect of the spectrum data retained in the dictionary data. The discrimination processing of the spectrum measuring apparatus 11 will be described below centering on the difference between this embodiment and the fifth embodiment. Overlapping description of the configuration of the spectrum measuring apparatus 11 between this embodiment and the fifth embodiment is omitted.

Figure 17:
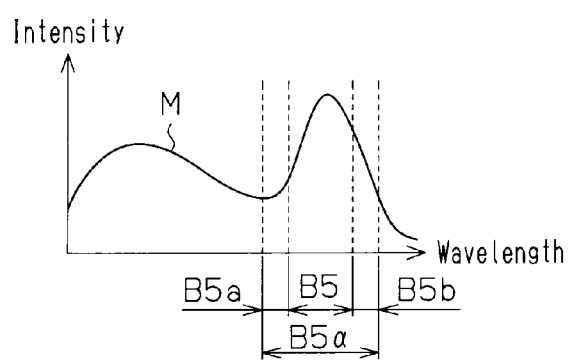
FIG. 17 is a graph describing dictionary data used in a discrimination processing of a movable body spectrum measuring apparatus according to a seventh embodiment of the present invention.

As shown in a graph M in FIG. 17, spectrum data having a protrusion in each of a region of short wavelength and a region of long wavelength is retained in the dictionary data storing unit 16 as the dictionary data corresponding to a "person". As described above, the dictionary data includes much wavelength information and light intensity information, and the amount of data is large.

The wavelength regions as characteristic parts of the spectrum data are retained in the wavelength information data storing unit 18 according to the measuring object as the wavelength information data. The wavelength information data includes the high-accuracy wavelength information data and the low-load wavelength information data. That is, as shown in FIG. 17, the wavelength region B5 of the spectrum data of a "person" is set as the low-load wavelength information data in the case where the measuring object is a "person". A wavelength region B5a obtained by extending the wavelength region B5 of the spectrum data of a "person" by a wavelength band B5a in the short-wavelength direction and by a wavelength band B5b in the long-wavelength direction is set as the high-accuracy wavelength information data. The wavelength region may be extended or contracted from the wavelength region B5 by any amount of change. In this case, the discrimination accuracy can be finely adjusted.

As described above, by applying the high-accuracy or low-load wavelength information data for a "person" retained in the wavelength information data storing unit 18 to the spectrum data of the measuring object "person", which is retained in the dictionary data storing unit 16, a small amount of spectrum data, in which the wavelength band is limited to the wavelength information data, can be acquired.

In this manner, the amount of data in the recognition computation can be reduced while maintaining the adequate discrimination accuracy and preventing the time necessary for the discrimination processing from being increased.

As described above, this embodiment can achieve advantages that are equal or equivalent to the advantages (1) and (2) in the first embodiment and the advantages (10) and (11) in the fifth embodiment as well as the following advantage.

(13) The recognition level is changed to be low or high by extending or contracting the unused region. Thereby, the adequate discrimination level required according to the real-time processing can be selected.

Eighth Embodiment

Figure 18:
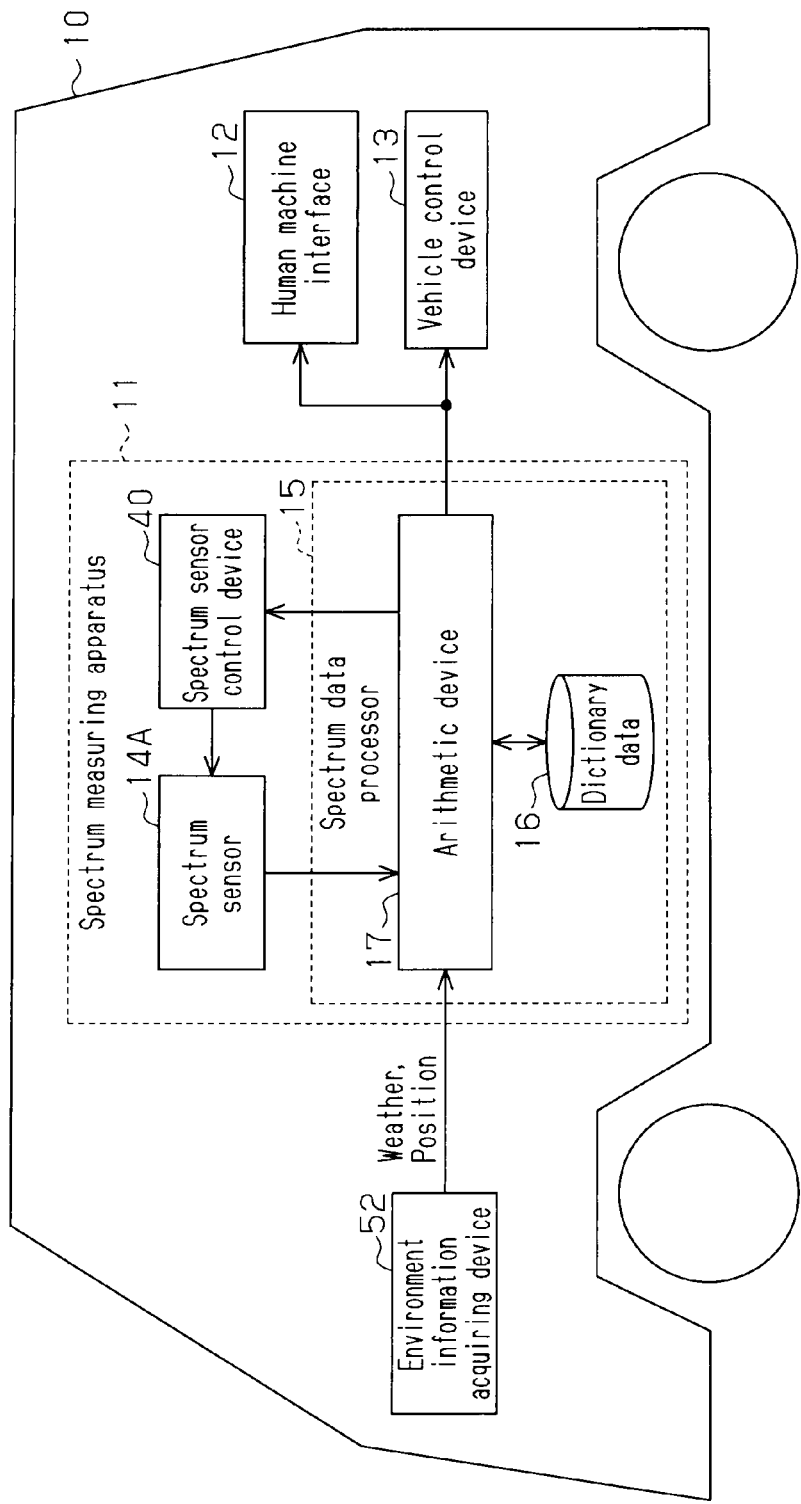
FIG. 18 is a block diagram showing a movable body according to an eighth embodiment provided with a movable body spectrum measuring apparatus of the present invention.

FIG. 18 shows schematic configuration of an eighth embodiment of the movable body spectrum measuring apparatus according to the present invention. This embodiment is different from the third embodiment in that the object detecting device 50 is changed to an environment information acquiring device 52. Specific configuration of the spectrum measuring apparatus 11 will be described below centering on the difference between this embodiment and the first and third embodiments. The same members as those in the first and third embodiments are given the same reference numerals in FIG. 18, and overlapping description thereof is omitted.

FIG. 18 is a block diagram showing features of the vehicle as the movable body provided with the movable body spectrum measuring apparatus. As shown in FIG. 18, the vehicle 10 is provided with the environment information acquiring device 52 in addition to the spectrum measuring apparatus 11, the human machine interface 12 and the vehicle control device 13.

The environment information acquiring device 52 is an environment acquiring device for acquiring information regarding the external environment of the vehicle 10, such as weather and position, and transmits the detected environment information to the connected arithmetic device 17. In this embodiment, a navigation system that detects position information of the vehicle 10 and represents the position on a map on a display panel to transmit the information to the occupant and the like is employed as the environment information acquiring device 52. Other examples of the environment information acquiring device 52 for acquiring weather include a device for detecting a wiper operation, a device for acquiring a value of a thermometer, a hygrometer or a barometer, and a device for acquiring weather through communication with a radio and a weather informing system. Other examples of the environment information acquiring device 52 for acquiring position include a navigation system for identifying position on the basis of position information from GPS (Global Positioning System) or combination of the position information and a map, and a device for acquiring position information through communication with a system for informing position information.

The spectrum measuring apparatus 11 is provided with the spectrum sensor 14A, the spectrum data processor 15 and the spectrum sensor control device 40. The spectrum data processor 15 is provided with the arithmetic device 17 and the dictionary data storing unit 16.

As in the third embodiment, the spectrum sensor 14A outputs the detected observation light as the spectrum data consisting of the wavelength information and the light intensity information, and changes the wavelength at which the light intensity information is detected.

The arithmetic device 17 selects the measuring object on the basis of information informed from the connected environment information acquiring device 52. Thereby, the measuring object selected on the basis of the information from the environment information acquiring device 52 can be rapidly discriminated in detail.

Thus, time necessary for the discrimination processing in the spectrum measuring apparatus can be reduced.

As described above, this embodiment can achieve advantages that are equal or equivalent to the advantages (1) to (13) in the first to seventh embodiments as well as the following advantages.

(14) According to the environment information acquired by the environment information acquiring device 52, the measuring object having a high occurrence ratio or the measuring object having a high priority is preferentially subjected to the discrimination processing. This enables quick discrimination of the measuring object. Since the recognition processing of the measuring object having a low occurrence ratio is omitted, the time necessary for the discrimination processing is reduced.

(15) When the acquired environment information is weather information, the measuring object is discriminated quickly by increasing the priority for an umbrella, a puddle or a wet measuring object that has a high occurrence ratio in the case of rainy weather and has a low priority in the case of sunny weather. When the environment information is position information on the movable body, the measuring object is discriminated quickly by setting the measuring object having a high priority to a car or a while line on a road in the case of motor highways, a road in the case of agricultural fields, a person or a traffic light in the case of urban areas and a person, especially, a child or an older person in the case of residential streets.

Ninth Embodiment

Figure 19:
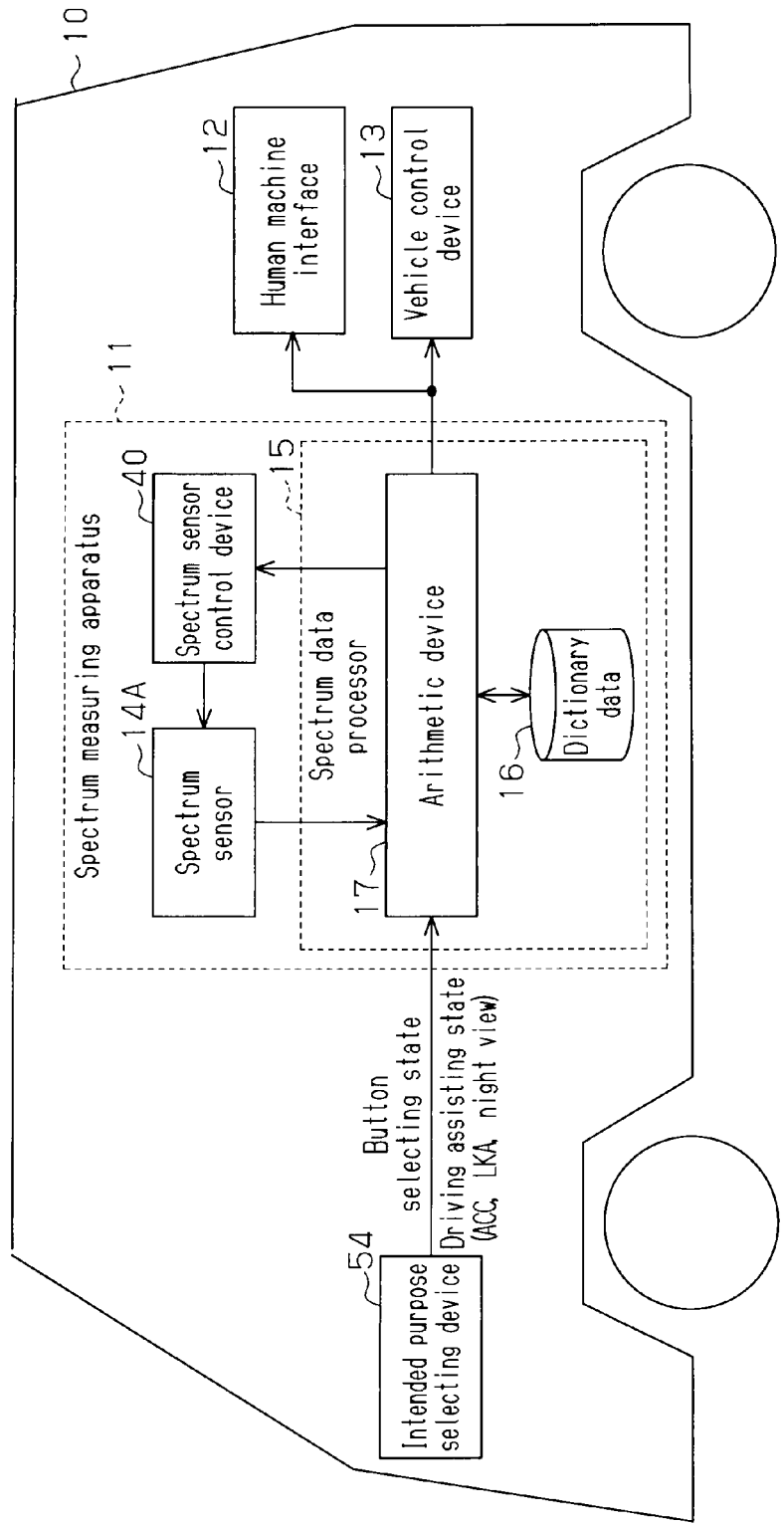
FIG. 19 is a block diagram showing a movable body according to a ninth embodiment provided with a movable body spectrum measuring apparatus of the present invention.

FIG. 19 shows schematic configuration of a ninth embodiment of the movable body spectrum measuring apparatus according to the present invention. This embodiment is different from the third embodiment in that the object detecting device 50 is changed to an intended purpose selecting device 54. The specific configuration for the spectrum measuring apparatus 11 will be described below, centering on the difference between this embodiment and the first and third embodiments. The same members as those in the first and third embodiments are given the same reference numerals in FIG. 19, and overlapping description thereof is omitted.

FIG. 19 is a block diagram showing features of the vehicle as the movable body provided with the movable body spectrum measuring apparatus. As shown in FIG. 19, the vehicle 10 is provided with the intended purpose selecting device 54 in addition to the spectrum measuring apparatus 11, the human machine interface 12, and the vehicle control device 13.

The intended purpose selecting device 54 is a device for narrowing down the measuring object according to the system operating state of the vehicle 10 or the operator's selection, and transmits the narrowed down measuring object to the connected arithmetic device 17. For example, a discrimination object selecting button provided at the vehicle 10 may be employed as the intended purpose selecting device 54. In addition, when drive assistance is performed by adaptive cruise control (ACC) to control the distance from the vehicle ahead, the intended purpose selecting device 54 may select a car as the measuring object. When drive assistance is performed by lane keeping assistance control (LKA) to control a lane for the vehicle, a white line on the road surface may be selected as the measuring object. When drive assistance is performed by an on-vehicle night vision device (night view), a pedestrian may be selected as the measuring object. The measuring object is discriminated in cooperation with a drive assistance system in this manner to attain an object of the assistance, which increases the usability of the movable body spectrum measuring apparatus.

The spectrum measuring apparatus 11 is provided with the spectrum sensor 14A, the spectrum data processor 15 and the spectrum sensor control device 40. The spectrum data processor 15 is provided with the arithmetic device 17 and the dictionary data storing unit 16.

As in the third embodiment, the spectrum sensor 14A can output the detected observation light as the spectrum data consisting of the wavelength information and the light intensity information, and change the wavelength at which the light intensity information is detected.

The arithmetic device 17 selects the measuring object on the basis of information informed from the connected intended purpose selecting device 54. Thereby, the measuring object selected on the basis of the information from the intended purpose selecting device 54 can be rapidly discriminated in detail.

Thus, the time necessary for the discrimination processing in the spectrum measuring apparatus can be reduced.

As described above, this embodiment can achieve advantages that are equal or equivalent to the advantages (1) to (13) in the first to seventh embodiments as well as the following advantages.

(16) The measuring object set by the intended purpose selecting device 54 can be preferentially subjected to the discrimination processing. By preferentially performing the discrimination processing of the measuring object that requires assistance of the spectrum measuring apparatus 11 in the movable body, the measuring object can be discriminated quickly. Further, since the recognition processing of the measuring object having a low occurrence ratio is omitted, time necessary for the discrimination processing is reduced.

(17) The measuring object having a high priority, which is determined according to the intended purpose of the drive assistance system, is preferentially subjected to the discrimination processing. As a result, the measuring object can be discriminated quickly and the recognition processing of the measuring object having a low occurrence ratio is omitted, thereby reducing time necessary for the discrimination processing. For example, when drive assistance is performed by adaptive cruise control (ACC) to control the distance from the vehicle ahead, the intended purpose selecting device 54 may select a car as the measuring object having a high priority. When drive assistance is performed by lane keeping assistance control (LKA) to control a lane for the vehicle, a white line on the road surface may be selected as the measuring object having a high priority. When drive assistance is performed by the on-vehicle night vision device (night view), a pedestrian may be selected as the measuring object having a high priority. The measuring object is discriminated in cooperation with a drive assistance system in this manner to attain an object of the assistance, which increases the usability of the movable body spectrum measuring apparatus.

Tenth Embodiment

Figure 20:
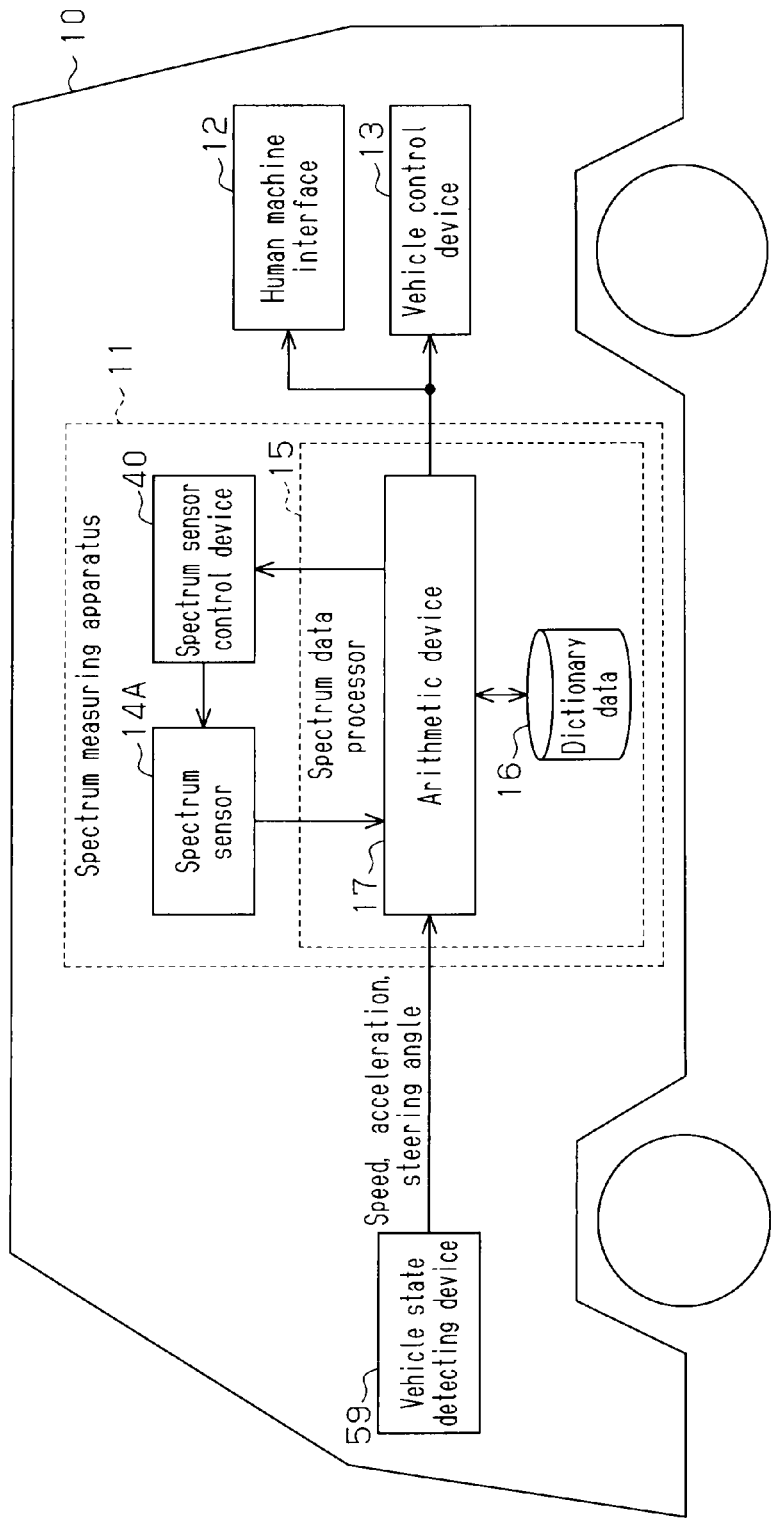
FIG. 20 is a block diagram showing a movable body according to a tenth embodiment provided with a movable body spectrum measuring apparatus of the present invention.

FIG. 20 shows schematic configuration of a tenth embodiment of the movable body spectrum measuring apparatus according to the present invention. This embodiment is different from the third embodiment in that the object detecting device 50 is changed to a vehicle state detecting device 59. Specific configuration of the spectrum measuring apparatus 11 will be described below centering on the difference between this embodiment and the first and third embodiments. The same members as those in the first and third embodiments are given the same reference numerals in FIG. 20, overlapping description thereof is omitted.

FIG. 20 is a block diagram showing features of the vehicle as the movable body provided with the movable body spectrum measuring apparatus. As shown in FIG. 20, the vehicle 10 is provided with the vehicle state detecting device 59 in addition to the spectrum measuring apparatus 11, the human machine interface 12 and the vehicle control device 13.

The vehicle state detecting device 59 is a detecting device for acquiring the state of the vehicle 10, especially, the driving state and transmits the detected vehicle state to the connected arithmetic device 17. A speedometer for detecting vehicle speed as moving speed of the vehicle 10, an accelerometer for detecting acceleration of the vehicle 10 or a device for detecting the steering angle of the vehicle 10 may be employed as the vehicle state detecting device 59.

The spectrum measuring apparatus 11 is provided with the spectrum sensor 14A, the spectrum data processor 15 and the spectrum sensor control device 40. The spectrum data processor 15 is provided with the arithmetic device 17 and the dictionary data storing unit 16.

The arithmetic device 17 selects the measuring object on the basis of information informed from the connected vehicle state detecting device 59. Thereby, the measuring object selected on the basis of the information from the vehicle state detecting device 59 can be rapidly discriminated in detail. Alternatively, by reliably correcting the spectrum data of the observation light, the measuring object is rapidly discriminated in detail and with high accuracy.

Thus, the time necessary for the discrimination processing in the spectrum measuring apparatus can be reduced.

As described above, this embodiment can achieve advantages that are equal or equivalent to the advantages (1) to (13) in the first to seventh embodiments as well as the following advantages.

(18) The measuring object having a high priority, which is determined according to the moving state acquired by the vehicle state detecting device 59, is preferentially subjected to the discrimination processing. As a result, the measuring object can be discriminated quickly and the recognition processing of the measuring object having a low occurrence ratio is omitted, thereby reducing time necessary for the discrimination processing.

(19) The measuring object having a high priority is determined on the basis of speed information, acceleration information or steering information of the movable body. For example, it is possible to change the discrimination level according to the speed information or the acceleration information so that the discrimination processing is finished within a predetermined period. According to the steering information, the measuring object is set to the car in the case of steering of moving across a driveway and is set to the pedestrian in the case of steering of moving across a sidewalk.

The above-mentioned embodiments can be implemented as follows, for example.

The fourth embodiment exemplifies the case where the attribute map data is used as the dictionary data. However, the attribute map data may be used in the tentative discrimination performed prior to the recognition computation. In this case, the attribute map data separately from the dictionary data may be retained in the attribute map storing unit 19.

The fourth embodiment exemplifies the case where the attribute map data is used as the dictionary data. However, the wavelength region having the bright-line spectrum in the spectrum data may be set as the attribute map data.

The sixth embodiment exemplifies the case where tentative discrimination is performed by the discrimination processing. However, tentative discrimination does not necessarily need to be performed by the discrimination processing.

The eighth to tenth embodiments exemplify the case where the environment information acquiring device 52, the intended purpose selecting device 54 and the vehicle state detecting device 59 are applied to the spectrum measuring apparatus 11 described in the third embodiment. However, the environment information acquiring device 52, the intended purpose selecting device 54 or the vehicle state detecting device 59 may be applied to the spectrum measuring apparatus 11 described in the first, second, fourth to seventh embodiments. In other words, these devices may be applied to the spectrum measuring apparatus having no spectrum sensor control device or the spectrum measuring apparatus having the wavelength information data storing device. This extends the scope of application of the movable body spectrum measuring apparatus.

Tentative discrimination may be applied to any of the above-mentioned embodiments. Thus, the measuring object or the used dictionary can further be narrowed down reliably prior to the recognition computation, resulting in the measuring object can be rapidly discriminated.

Figure 21:
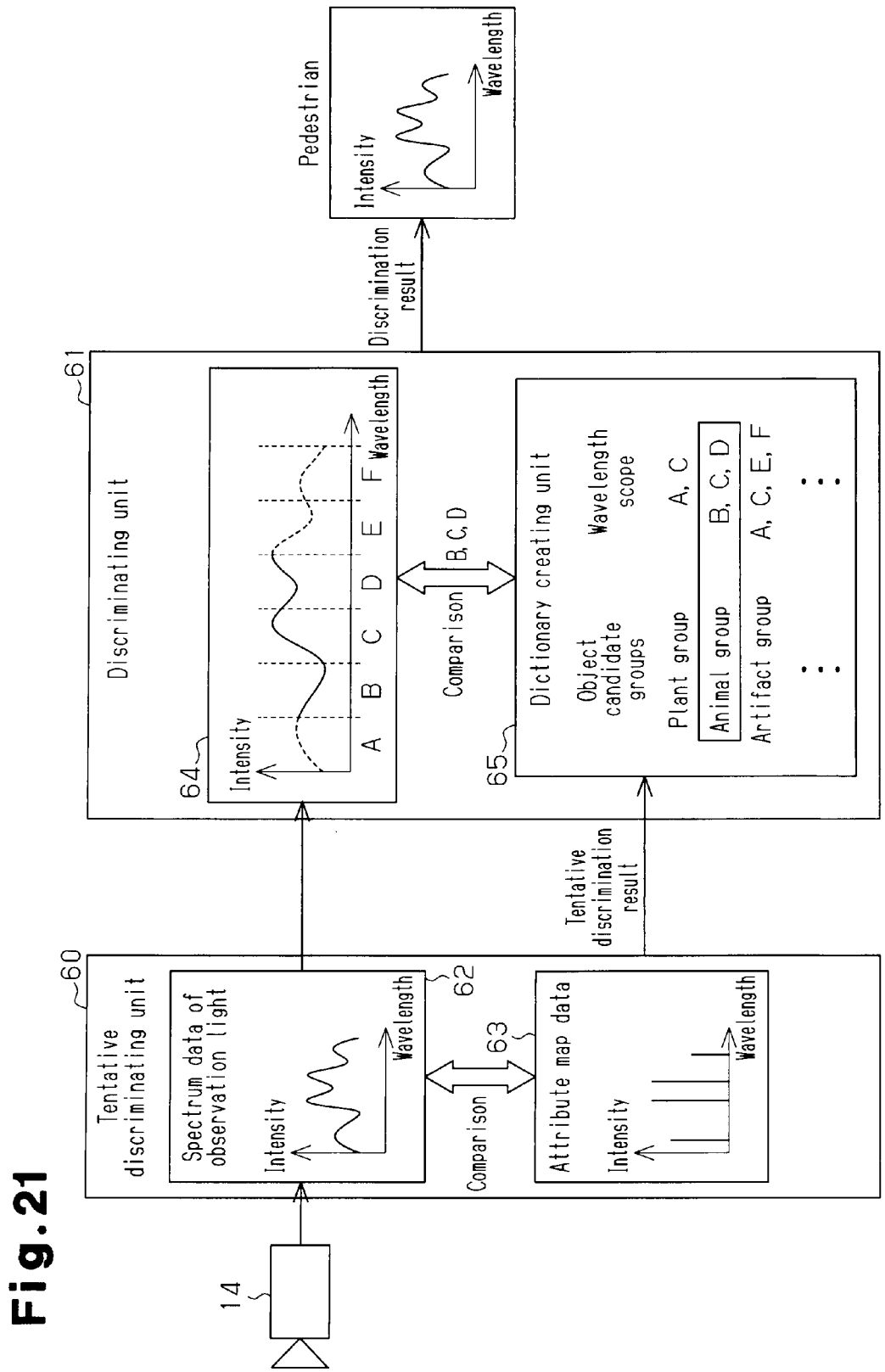
FIG. 21 is an explanation view showing a movable body according to another embodiment provided with a movable body spectrum measuring apparatus of the present invention.

The wavelength region of the spectrum data as the dictionary data used in the comparison computation may be narrowed down by tentative discrimination. That is, as shown in FIG. 21, a tentative discrimination unit 60 provided in the spectrum measuring apparatus may perform tentative discrimination on the basis of a comparison computation for comparing the spectrum data of the observation light with the attribute map data. A discrimination unit 61 that receives a tentative discrimination result is provided with a dictionary creating unit 65, and the dictionary creating unit 65 selects an object candidate group from previously prepared candidate group map data and creates candidate group dictionary data 64 formed of a wavelength scope as a wavelength region corresponding to the selected object candidate group. Then, the discrimination unit 61 may compare the candidate group dictionary data 64 with the spectrum data of the observation light to discriminate the measuring object. This enables rapid narrowing, increasing the flexibility in the comparison computation.

The first to seventh embodiments exemplify the case where, as the dictionary data, the partial wavelength region of the spectrum data is missing, the case where only the bright-line spectrum is retained, the case where the attribute map is retained, and the case where the whole wavelength band of the spectrum data is retained and the unused region is set by the comparison computation and only the bright-line spectrum is set. However, the above-mentioned various types of dictionary data may be appropriately combined with each other as necessary. This increases the flexibility in design.

The vehicle in each of the above-mentioned embodiments may be an automobile. Even when being mounted on an automobile, such spectrum measuring apparatus can recognize the measuring object that sequentially approaches during driving on the road in real time to achieve adequate drive assistance. This increases the adoptability of the spectrum measuring apparatus to an automobile.

In each of the above-mentioned embodiments, the vehicle is not limited to the automobile, and movable bodies moving on the road, such as motorcycles and robots, can employ such movable body spectrum measuring apparatus.

DESCRIPTION OF REFERENCE NUMERALS

10 . . . Vehicle, 11 . . . Spectrum Measuring Apparatus, 12 . . . Human Machine Interface, 13 . . . Vehicle Control Device, 14, 14A . . . Spectrum Sensor, 15 . . . Spectrum Data Processor, 16 . . . Dictionary Data Storing Unit, 17 . . . Arithmetic Device, 18 . . . Wavelength Information Data Storing Unit, 19 . . . Attribute Map Storing Unit, 40 . . . Spectrum Sensor Control Device, 50 . . . Object Detecting Device, 52 . . . Environment Information Acquiring Device, 54 . . . Intended Purpose Selecting Device, 59 . . . Vehicle State Detecting Device as Moving State Acquiring Device.

What is claimed is:

1. A movable body spectrum measuring apparatus provided with a spectrum sensor mounted on a movable body, the spectrum sensor being capable of measuring wavelength information and light intensity information, the movable body spectrum measuring apparatus discriminating a measuring object around the movable body on the basis of spectrum data of observation light detected by the spectrum sensor, and comprising:
    a storing unit for storing therein, as dictionary data, the spectrum data including the wavelength information and the light intensity information about a plurality of predetermined measuring objects; and
    an arithmetic device for discriminating the measuring objects on the basis of a comparison computation for comparing the spectrum data of the observation light and the spectrum data stored in the storing unit,
    wherein the arithmetic device performs the comparison computation for comparing the spectrum data of the observation light and the spectrum data by referring to only a partial wavelength band of the spectrum data stored in the storing unit as the dictionary data,
    wherein the spectrum data stored in the storing unit, as the dictionary data, is divided into a plurality of wavelength regions, and
    wherein partial wavelength band of data is selected from the plurality of wavelength regions such that data of the partial wavelength band is less than the spectrum data detected by the spectrum sensor, and that the partial wavelength band of data is processed by the arithmetic device in real time.

2. The movable body spectrum measuring apparatus according to claim 1, wherein
    only data in a wavelength region containing a characteristic change as the spectrum data among the divided wavelength regions is retained in the storing unit as the dictionary data.

3. The movable body spectrum measuring apparatus according to claim 2, wherein data in a wavelength region containing the characteristic change as the spectrum data is formed of a plurality of pieces of data determined according to an attribute of the measuring object.

4. The movable body spectrum measuring apparatus according to claim 1, wherein
    the spectrum data as the dictionary data is data indicating a bright-line spectrum determined corresponding to an extreme value or an inflection point as spectrum data of each of a plurality of divided wavelength regions, and only the data indicating the bright-line spectrum is retained in the storing unit as the dictionary data.

5. The movable body spectrum measuring apparatus according to claim 4, wherein the data indicating the bright-line spectrum is formed of a plurality of pieces of data determined according to an attribute of the measuring object.

6. The movable body spectrum measuring apparatus according to claim 1, wherein, in a comparison computation for comparing the spectrum data of the observation light with the spectrum data stored in the storing unit as the dictionary data, the arithmetic device sets an unused region in the spectrum data as the dictionary data and performs the comparison computation on the basis of spectrum data other than the unused region to discriminate the measuring object.

7. The movable body spectrum measuring apparatus according to claim 6, wherein the unused region is set as a region having a small characteristic change as the spectrum data according to an attribute of the measuring object.

8. The movable body spectrum measuring apparatus according to claim 6, wherein the unused region is made variable according to discrimination request level of the measuring object.

9. The movable body spectrum measuring apparatus according to claim 1, further comprising an attribute map storing unit for storing therein, as attribute map data, data indicating a bright-line spectrum determined corresponding to an extreme value or an inflection point as the spectrum data,
wherein, prior to the comparison computation for comparing spectrum data of the observation light with the spectrum data stored in the storing unit as the dictionary data, the arithmetic device performs a comparison computation for comparing the spectrum data of the observation light with the attribute map data to perform tentative discrimination of the measuring object, and narrows down in advance a partial wavelength region in the spectrum data as the dictionary data as a wavelength region used in the comparison computation according to an attribute of the measuring object subjected to the tentative discrimination.

10. The movable body spectrum measuring apparatus according to claim 1, wherein
the movable body is provided with an environment information acquiring device for acquiring surrounding environment information, and
the arithmetic devices narrows down in advance spectrum data as the dictionary data according to the environment information acquired by the environment information acquiring device.

11. The movable body spectrum measuring apparatus according to claim 10, wherein the environment information acquired by the environment information acquiring device is at least one of weather information and position information of the movable body.

12. The movable body spectrum measuring apparatus according to claim 1, wherein
the movable body is provided with an intended purpose selecting device for selecting intended purpose of the spectrum sensor, and
the arithmetic device narrows down in advance spectrum data as the dictionary data according to the intended purpose selected by the intended purpose selecting device.

13. The movable body spectrum measuring apparatus according to claim 12, wherein
the movable body is provided with a drive assistance system for assisting driving, and
the intended purpose selecting device selects the intended purpose in cooperation with the drive assistance system.

14. The movable body spectrum measuring apparatus according to claim 1, wherein
the movable body is provided with a moving state acquiring device for acquiring information on a moving state of the movable body, and
spectrum data as the dictionary data is narrowed down in advance according to the moving state acquired by the moving state acquiring device.

15. The movable body spectrum measuring apparatus according to any one of claim 14, wherein information on the moving state of the movable body, which is acquired by the moving state acquiring device, is at least one of speed information, acceleration information and steering information of the movable body.

16. The movable body spectrum measuring apparatus according to claim 1, wherein the movable body is an automobile driving on a road surface.

17. A movable body spectrum measuring apparatus provided with a spectrum sensor mounted on a movable body, the spectrum sensor being capable of measuring wavelength information and light intensity information, the movable body spectrum measuring apparatus discriminating a measuring object around the movable body on the basis of spectrum data of observation light detected by the spectrum sensor, and comprising:
an attribute map storing unit for storing therein, as attribute map data, data indicating a bright-line spectrum determined corresponding to an extreme value or an inflection point as the spectrum data; and
an arithmetic device for performing tentative discrimination of the measuring object on the basis of a comparison computation for comparing the spectrum data of the observation light with the attribute map data,
wherein, prior to the comparison computation for comparing spectrum data of the observation light with the spectrum data stored in the storing unit as the dictionary data, the arithmetic device performs a comparison computation for comparing the spectrum data of the observation light with the attribute map data to perform tentative discrimination of the measuring object, and narrows down in advance a partial wavelength region in the spectrum data as the dictionary data as a wavelength region used in the comparison computation according to an attribute of the measuring object subjected to the tentative discrimination.

18. The movable body spectrum measuring apparatus according to claim 17, wherein the attribute map data is formed of a plurality of pieces of data determined according to an attribute of the measuring object.

19. The movable body spectrum measuring apparatus according to claim 17, further comprising a storing unit for storing therein, as dictionary data, the spectrum data including the wavelength information and the light intensity information about a plurality of predetermined measuring objects,
wherein the arithmetic device narrows down in advance a part of a wavelength region in the spectrum data as the dictionary data according to the attribute of the measuring object subjected to the tentative discrimination, and discriminates the measuring objects on the basis of a comparison computation for comparing the spectrum data of the observation light and only the part of the wavelength region narrowed down from the spectrum data as the dictionary data.

* * * * *